US008472584B2

(12) United States Patent
Lindsay

(10) Patent No.: US 8,472,584 B2
(45) Date of Patent: Jun. 25, 2013

(54) APPARATUS AND METHOD FOR KILLING PATHOGENIC AND NON-PATHOGENIC ORGANISMS USING LOW-ENERGY X-RAYS

(75) Inventor: John T. Lindsay, Pinckney, MI (US)

(73) Assignee: Ray Fresh Foods, Inc., Ann Arbor, MI (US)

( * ) Notice: Subject to any disclaimer, the term of this patent is extended or adjusted under 35 U.S.C. 154(b) by 754 days.

(21) Appl. No.: 12/387,286

(22) Filed: Apr. 30, 2009

(65) Prior Publication Data

US 2010/0075003 A1   Mar. 25, 2010

Related U.S. Application Data

(63) Continuation-in-part of application No. 10/960,819, filed on Oct. 7, 2004, now abandoned.

(60) Provisional application No. 60/509,351, filed on Oct. 7, 2003.

(51) Int. Cl.
*G21K 5/00* (2006.01)

(52) U.S. Cl.
USPC ............................................. 378/64

(58) Field of Classification Search
USPC ................................. 378/64, 68, 69, 119, 121
See application file for complete search history.

(56) References Cited

U.S. PATENT DOCUMENTS 6,127,687 A * 10/2000 Williams et al. ........... 250/492.3

* cited by examiner

*Primary Examiner* — Courtney Thomas
(74) *Attorney, Agent, or Firm* — Hope Baldauff, LLC

(57) ABSTRACT

An apparatus and method for killing pathogenic and non-pathogenic organisms using low-energy x-rays including a shielding assembly that maximizes internal deflections preventing x-rays from escaping the apparatus enclosing an irradiation zone having a passageway between inlet and outlet portions along a conveyor having either a two-level inline or non-linear geometry that continuously moves the articles to be irradiated through the irradiation zone at a first velocity; and an irradiation chamber housing at least one x-ray having a first power level capable of emitting x-rays for a period of time sufficient to provide at least a predetermined dose of radiation to an article and capable of a maximum continuous power output at 100% duty cycle that is selected from within range of from approximately 16 kW to approximately 20 kW to thereby continuously emit low-energy x-rays having energies of from approximately 10 KeV and up to a maximum of approximately 440 KeV.

12 Claims, 30 Drawing Sheets

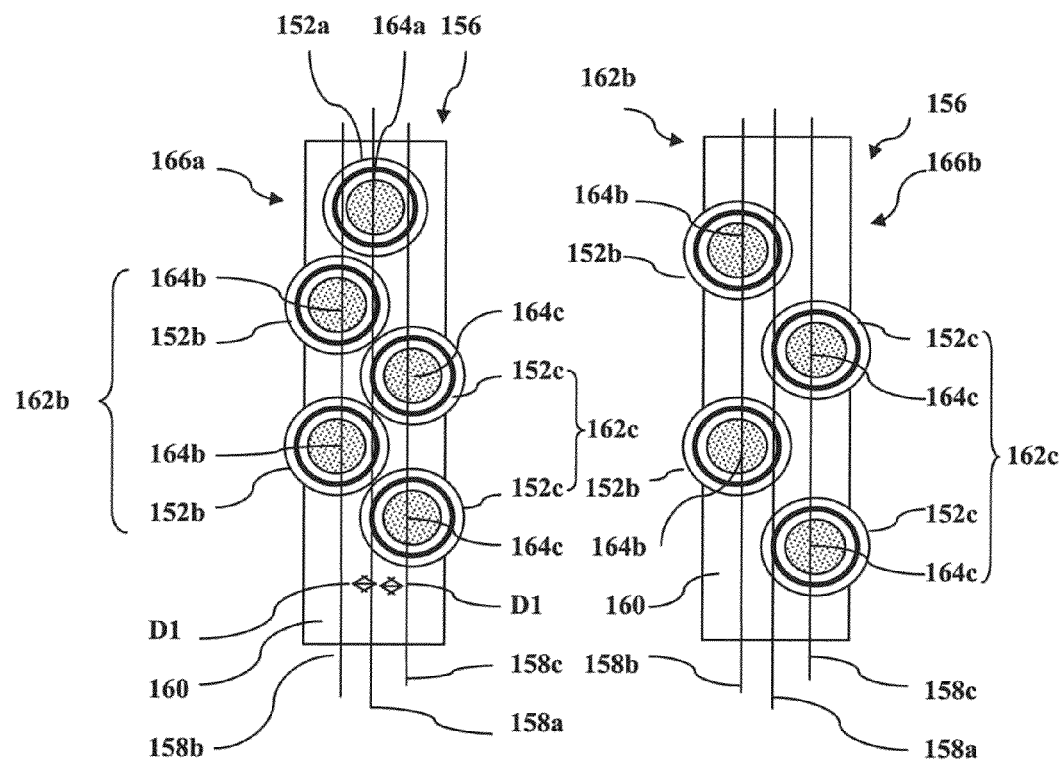

APPARATUS AND METHOD FOR KILLING PATHOGENIC AND NON-PATHOGENIC ORGANISMS USING LOW-ENERGY X-RAYS

CROSS-REFERENCE TO RELATED APPLICATIONS

This application is a continuation-in-part of, and claims the benefit of priority from, U.S. Provisional Patent Application Ser. No. 10/960,819, filed Oct. 7, 2004 now abandoned, which claims the benefit of priority from U.S. Provisional Patent Application Ser. No. 60/509,351, filed Oct. 7, 2003. The disclosures of each of these applications are hereby incorporated herein by reference in their entireties.

FIELD OF THE INVENTION

The invention pertains to a method and apparatus employing low-energy x-rays to kill pathogenic and non-pathogenic organisms in a variety of articles, including foodstuffs, water, etc., and more particularly to the employment of bremsstrahlung-type x-rays characterized by a continuous range of energies from that of the most energetic electron downwards, this range of energies being of from approximately 10 KeV up to a maximum of approximately 440 KeV.

BACKGROUND

In the United States alone, as many as 9,000 deaths annually are believed to be attributable to food-borne pathogens such as *salmonella, listeria, E. coli, trichinella, staphylococcus*, etc. And, for at least the years 1997-2000, there was a significant annual increase in the number of food products recalled by reason of contamination.

The hazards of natural contamination aside, intentional adulteration of the food supply—also labeled "bioterrorism"—is a widely recognized national security concern. As noted, for example, in a 2005 Congressional Research Service report for the 109th Congress: "There is widespread concern that naturally occurring pathogens such as *E. coli* 0157:H7, *salmonella, listeria,* and *botulinum* toxin could be used as bioterrorist weapons and could spread through the multi-link food distribution chain. Such an attack would be particularly lethal to children, the elderly, and the immune-compromised." Donna Vogt, *CRS REPORT FOR CONGRESS: food safety issued in the* 109th *Congress* (updated Feb. 4, 2005).

Congress recognized the urgency of the crisis when it passed the Public Health Security and Bioterrorism Preparedness and Response Act (P.L. 107-188) in 2002. The act seeks to more tightly control, including through the Food and Drug administration ("FDA"), the importation and domestic processing of foodstuffs. See, e.g., http//www.cfsan.fda.gov/~dms/defter.html.

The FDA also recognizes the risk of bioterrorism, and has proposed prevention means which would include the promulgation of further "regulations requiring companies to implement practical food defense measures at specific points in the food supply chain." See http://www.fda.gov/oc/initiatives/advance/food/plan.html#1.1.

High-energy ionizing radiation has long been employed to treat foodstuffs such as spices, wheat, wheat flour and potatoes. More recently, such ionizing energy has begun to be employed in the treatment of foodstuffs such as meat, including poultry and pork. See, e.g., FDA (HHS) Final Rule on the Use of Irradiation in the Production, Processing, and Handling of Food, federal Register 50, 29658-29659 (July 1985). Most recently, the FDA has approved the use of radiation to treat leafy green vegetables such as spinach and lettuce. See, e.g., http://www.mcclatchydc.com/244/story/49758.html.

The increasing use of irradiation technology has been driven by the growing incidents of sickness and death attributable to food-borne pathogens. Presently, some twenty-seven countries employ irradiation in food processing. In the United States, the FDA and the Department of Agriculture (USDA) are responsible for the establishment of regulatory guidelines respecting food irradiation processes. These guidelines specify the maximum radiation dosage to be delivered to any given food or beverage product.

High-energy ionizing radiation has long been employed to treat foodstuffs such as spices, wheat, wheat flour and potatoes. More recently, such ionizing energy has begun to be employed in the treatment of foodstuffs such as meat, including poultry and pork. See, e.g., FDA (HHS) Final Rule on the Use of Irradiation in the Production, Processing, and Handling of Food, Federal Register 50, 29658-29659 (July 1985). The increasing use of irradiation technology has been driven by the growing incidents of sickness and death attributable to foodborne pathogens. Presently, some twenty-seven countries employ irradiation in food processing. In the United States, the Food and Drug Administration (FDA) and the Department of Agriculture (USDA) are responsible for the establishment of regulatory guidelines respecting food irradiation processes. These guidelines specify the maximum radiation dosage to be delivered to any given food or beverage product.

Foodstuff irradiation is currently carried out using one or more of the following types of ionizing energy: Gamma rays; high-energy x-rays; and high energy electrons. Gamma ray sources are by far the most prevalent type of ionizing energy used in the food processing industry. These sources typically consist of large quantities of radioactive Cobalt ($Co^{60}$) or Cesium ($Cs^{137}$). Gamma ray sources generally have from 1 to 5 discrete energy gammas, as opposed to a continuous energy spectrum such as x-ray sources. Gamma ray sources are thus characterized as discrete energy sources. Gamma rays currently being used in food irradiation have energies in the range of from about 0.66 to about 1.33 million electron volts (MeV). Such high-energy gamma rays are able to significantly penetrate relatively dense foodstuffs, such as poultry and meats, as well as large volumes, such as palletized foodstuffs. However, gamma radiation sources suffer from a number of drawbacks which have thus far hampered the wider expansion of their use in food processing. As gamma radiation is a continuous emission (i.e., it cannot be "turned off"), harmful to humans, the source material (i.e., $Co^{60}$ or $Cs^{137}$) must be encapsulated in metal enclosures and stored in a deep pool of water when not in use in order to provide adequate protection for workers and the surrounding environment. This translates into the need for large, non-mobile facilities and, consequently, the need to ship foodstuffs from diverse locations to the gamma radiation source for treatment. It is, moreover, difficult to provide uniform radiation doses to a variety of foodstuffs, making the employment of gamma ray sources undesirable for a more comprehensive array of foodstuffs.

A still further drawback to conventionally employed gamma ray sources is the risk of their employment by terrorist. In February, the National Research Council of the National Academies ("NRC") released a Congressionally-mandated report entitled "Radiation Source Use and Replacement." In that report, which may be viewed in its entirety on the Internet at http://nap.edu/catalog.php?record id=11976, the NRC recognized that existing industrial radiation sources, including $Co^{60}$ or $Cs^{137}$, both of which are employed in commercial food irradiation systems, have the potential to serve as ingredients in radiological dispersal devices-so-called "dirty bombs." See U.S. Nuclear Regulatory Commission Information Sheet. Accordingly, the NRC recommends that the U.S. government adopt policies incentivizing replacement of such high-risk radionuclide sources. This threat of "dirty bombs" is a very real one, having been recognized by the Department of Homeland Security.

Of the other conventional sources of ionizing energy, high-energy x-rays may be produced by acceleration electrons at high speeds onto a high Z (atomic number) target material, typically tungsten, tantalum, and stainless steel. Those electrons stopping in the target material produce a continuous energy spectrum of x-rays. The method of producing high energy electrons most commonly used today produces x-rays as a result of igniting an electron cyclotron resonance plasma inside an evacuated dielectric spherical chamber filled with a heavy atomic weight, non-reactive gas or gas mixture at low pressure. The spherical chamber is located inside a non-evacuated microwave resonant cavity that is in turn located between two magnets to form a magnetic mirror. Conventional microwave energy fed into the resonant cavity ignites the plasma and creates a hot electron ring from which electrons bombard the heavy gas and dielectric material to create an x-ray emission. The disclosures of U.S. Pat. No. 5,461,656, and No. 5,838,760 are exemplary. Lower energy x-rays are then filtered from this spectrum to provide a beam capable of penetrating through larger items while still maintaining a relative uniform absorption rate throughout the foodstuff being irradiated. To further ensure dosage uniformity, the foodstuff being irradiated is typically reversed in direction and orientation from the directions and orientation in which the exposure was initially made.

Conventional x-ray generating apparatus, such as the x-ray tube 100 diagrammatically shown in FIG. 1, includes a target material 102. The target material 102 is typically an element with a high Z (atomic) number, and usually comprises tungsten (Z=84), although other materials, including tantalum (Z=73), rhodium, copper, chromium, platinum, and molybdenum, as well as alloys such as rhenium-tungsten-molybdenum, are also used. X-rays are produced by accelerating electrons e– at high speeds toward this target material 102. Upon the accelerated electrons e– striking the target material 102, x-rays are produced in two forms. The first form, commonly referred to as brehmsstralung radiation, is the product of deviations in the trajectory of accelerated electrons as they pass the electron cloud surrounding the target atoms. The second form, known as characteristic radiation, is the product of the interaction between accelerated electrons and inner-shell electrons of the target atoms. More particularly, the accelerated electrons ionize inner shell electrons in the target atoms, causing outer shell electrons to move to occupy the "hole" created by the excited inner shell electron. This movement of each outer shell electron to an inner shell is accompanied by the emission of photons in the x-ray spectrum by the target atoms' electrons typically called characteristic x-rays. The majority of any given x-ray field typically comprises brehmsstralung-type radiation but does have a limited characteristic x-ray component.

Conventionally, acceleration of the electrons e– is accomplished by creating a large voltage potential across a finite space defined between a positive anode 104 comprising the target material 102, and a negative cathode 106 comprising a filament circuit (e.g., tungsten).

Alternatively, however, electron acceleration may conventionally be accomplished by having an anode maintained at ground potential, with the cathode having a high negative potential. These elements are contained in a glass vacuum enclosure 108, which is in turn contained within a metal shielding enclosure 110 used to absorb the emission therefrom of all but the desired x-rays. A suitable power source (not shown in FIG. 1) supplies the current to create the necessary electrical potential, and powers the filament circuit, which must be heated to incandescence to provide the source of accelerated electrons e–.

Conventional x-ray tubes further include cooling means, as the vast majority (approximately 98%) of radiation produced when the accelerated electrons e– strike the target is infrared (i.e., heat). Included among these cooling means is rotation of the anode 104.

Conventional x-ray tubes such as shown in FIG. 1 are further characterized by significant amounts of filtration materials 112 such as, for instance, aluminum, beryllium, glass, (and other low Z metal) to reduce the intensity of the x-ray beam 114 by absorbing lower energy photons. Further filtration also takes place as the x-ray beam exits the tube, passing first through an oil layer (not shown) and then through a beryllium (typically) window 116.

The high-energy x-rays conventionally used in the irradiation of foodstuffs have energies from 600 KeV to as high as 10 MeV rays in order to increase their penetration power. See, e.g., Report of the Consultant's Meeting on the Development of X-Ray Machines for Food Irradiation, Food and Agriculture Organization, IAEA, A-1400 (Vienna, Austria 1195. The use of high-energy x-rays is not as prevalent in the food irradiation industry primarily because conventional x-ray tubes are extremely energy inefficient. Only about 2% of energy input is translated into useful x-ray energy, the remainder being given off as heat (which must be dissipated through the expenditure of further energy). What is more, the use of high-energy x-rays requires significant shielding to protect workers from inadvertent exposure.

High-energy (i.e., up to 10 MeV) electrons, originally obtained from linear accelerators and Van de Graff generators, are characterized by the lowest penetrating power of currently-employed ionizing energy, and are therefore limited to use where the thickness of the foodstuff being irradiated is less that a few inches (3-4") in depth.

Several major drawbacks to conventional foodstuff irradiation methodologies include the adverse impact on taste, the production of alkylcyclobutanoes (ABCs) with the irradiated foodstuffs and the radiolyctic effects associated with emissions from Gamma Ray sources. In particular, some foodstuffs evidence a marked change in flavor including an increase in bitterness associated with fruit juices, such as orange juice and grapefruit juice and a rancid fat flavor in meat products such as beef and poultry following irradiation by gamma rays and high-energy electrons because the high energy radiation destroys not only the organic pathogens and non-pathogens in the foodstuff being irradiated but also destroys the cellular membranes and the other molecules forming the foodstuff (such as flavor molecules). Other conventional beverage treatment methods, such as, for instance, heat pasteurization, likewise adversely affect the taste of these products.

Thus, it is desirable to have a means for killing organisms, pathogenic and non-pathogenic alike, in various articles, including foodstuffs, medical supplies, personal hygiene products, agricultural seeds, etc., which means are at once economical, do not adversely affect the taste of treated foodstuffs, do not produce significant amounts of ABCs, may be selectively activated and deactivated, may be employed in an "inline" processing environment so as to avoid the necessity of transporting items to a separate facility for irradiation, have none of the adverse effects of radioactive materials, alleviate public apprehension about the use of radioactive isotopes as the treating radiation, and address both the threat of bioterrorism in relation to the food supply and the threat of radiological terrorism by addressing the NRC's call to replace existing radionuclide sources that could be used in the preparation of "dirty bombs" with a radiation source (i.e., one or more x-ray tubes or x-ray sources in accordance with the invention) incapable of such application.

SUMMARY OF THE INVENTION

An apparatus for killing pathogenic and non-pathogenic organisms using low-energy x-rays, the apparatus comprising a shielding assembly that maximizes internal deflections to prevent the x-rays from escaping the apparatus enclosing an irradiation zone having inlet portion and an outlet portion and defining a passageway therebetween, the passageway defining a path of travel for the articles to be irradiated between the inlet and outlet portions; means for substantially continuously moving the articles to be irradiated through the irradiation zone at least a first velocity; and an irradiation chamber that houses at least one x-ray source disposed within the passageway between the inlet and outlet portions in the path of travel of the articles to be irradiated, each at least one x-ray source having a first power level capable of emitting x-rays for a period of time sufficient to provide at least a predetermined dose of radiation to an article and capable of a maximum continuous power output at 100% duty cycle that is selected from within range of from approximately 16 kW to approximately 20 kW to thereby continuously emit low-energy x-rays having energies of from approximately 10 KeV and up to a maximum of approximately 440 KeV. A method for killing pathogenic and non-pathogenic organisms using low-energy x-rays comprising the steps of providing at least one x-ray source including an externally grounded end-type beam window x-ray tube having a window perpendicularly disposed to the longitudinal axis of the x-ray tube with a non-rotating large area anode with an outer surface parallel to the beam window; the at least one x-ray source capable of a maximum continuous power output at 100% duty cycle that is selected from within the range of from approximately 16 kW to approximately 20 kW to thereby continuously emit low-energy x-rays having energies of from approximately 10 KeV and up to a maximum of approximately 440 KeV; providing at least one article to be irradiated, the at least one article being characterized by an initial organism population; and exposing the at least one article to be irradiated to low-energy x-rays emitted by the at least one x-ray source for a period of time sufficient to provide a dose of radiation to the at least one article that achieves at least a predetermined reduction in the initial organism population, and wherein the low-energy x-rays emitted by the at least one x-ray source to which the at least one article is exposed are primarily bremsstrahlung-type x-rays characterized by a continuous range of energies from that of the most energetic electron downwards, this range of energies being of from approximately 10 KeV up to a maximum of approximately 440 KeV, wherein the maximum energy of the x-ray spectrum of the at least one x-ray source to which the article is exposed is selected according to the article being irradiated so as to maximize the amount of x-ray radiation which incompletely penetrates the article.

BRIEF DESCRIPTION OF THE DRAWINGS

FIGS. 7-10 diagrammatically illustrates a cross-sectional view a plurality of single-ended x-ray tubes disposed within an irradiation chamber.

DETAILED DESCRIPTION OF THE INVENTION

Definitions

As used herein, the following terms shall have the definitions as ascribed hereafter:

The term "low energy" refers to x-rays having energies exclusively in the range of below approximately 440 KeV, which range comprehends at least 440 KeV as the upper limit thereof.

The term "dose" means and refers to the amount of radiation absorbed by the product exposed to such radiation. It is generally accepted that the exposure rate (dose rate) is directly proportional to the power output by the tube. This means that $X_r \alpha P=(kVp) \times (mA)$, i.e. the exposure rate ($X_r$) is directly proportional ($\alpha$) to the power (P) which is the product of the kVp (voltage) and mA (amperage). Thus, when the power is doubled, the exposure rate is doubled. This doubling of the power can be achieved by either doubling the mA or doubling the kVp used to produce the x-rays. Therefore, given the previous relationship, if the power is increased by a factor of four, the dose rate is also increased by a factor of four provided other phenomena such as space charge limitations do not adversely affect the dose rate output.

"KeV" is a unit of measurement comprehending thousands of electron Volts.

"KvP" is the corresponding unit used to describe the maximum potential placed across an x-ray tube in thousands of volts potential.

"MeV" is a unit of measurement comprehending millions of electron Volts.

"Rads" or "radiation absorbed does" is a unit of measurement defined as 100 ergs absorbed by 1 gram of matter.

The "Gray," or "Gy," means and refers to a unit of measurement equivalent to 100 rads/kg.

A "kilogray," or "kGy," is equivalent to 1000 Gray.

A conveyor longitudinal axis is any axis projected along a longitudinal length of the conveyor aligned in a direction of path of travel of the conveyor.

An article is defined as any product that is irradiated within the apparatus for employing low-energy x-rays killing pathogenic and non-pathogenic organisms.

The invention is most generally characterized as an apparatus and method for employing low-energy x-rays killing pathogenic and non-pathogenic organisms in articles, including foodstuffs such as food and beverage products comprising, by way of non-limiting example, meats, poultry products, seafood, vegetables, fruits, nuts, spices, juices, water, etc., and also non-foodstuffs, by way of non-limiting example, medical supplies, personal hygiene products, agricultural seeds, etc.

Figure 2:
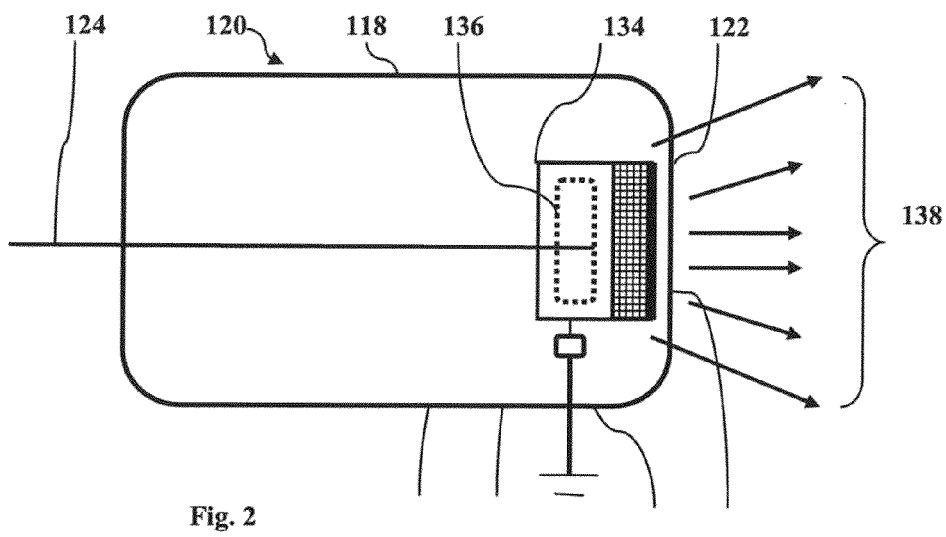
FIG. 2 illustrates one novel x-ray source for generating x-rays particularly suited to the method and apparatus of this invention.

In an embodiment of the invention, the x-ray source employed in practicing the invention, including in conjunction with the disclosed apparatus, may be an x-ray tube (hereinafter "tube") as illustrated in FIG. 2

Referring now to FIG. 2, one novel x-ray source for generating x-rays particularly suited to the method and apparatus of this invention comprises at least one externally-grounded housing 118 containing an end-type beam window x-ray tube 120 having a minimal thickness beam window 122 substantially perpendicularly disposed to the longitudinal axis of the x-ray tube 124, an anode 126 having an associated target 130 with an outer surface parallel to the beam window 122, a cathode 132 that is grounded and has an associated filament circuit. In an embodiment of the invention, the beam window 122 is formed of a Beryllium material and has a thickness of approximately 2.5 mm.

The housing 118, as well as all other foodstuff contacting surfaces of the apparatus may be manufactured from stainless steel or any other material specified as appropriate for the contact of foodstuffs by the FDA.

The anode 126 is fixed and does not rotate, wherein the anode 126 comprises a large diameter target 130 and a large focal spot compared to diameters and focal spot sizes of conventional imaging-type x-ray tubes. In an embodiment of the invention, the target is approximately 4 inches in diameter and the focal spot is approximately 6.8 cm (outer diameter) and approximately 4 cm (inner diameter).

Suitable materials for the target 130 and anode 126 include those conventionally known and commercially available from numerous sources, including, without limitation, materials such as tungsten, copper, aluminum, gold, platinum, strontium, titanium, and rhobidium, chromium, rhodium, molybdenum as well as alloys thereof.

In an embodiment of the invention, the anode 126 is formed from copper having the associated attached target 130 formed of tungsten.

The cathode 132 is maintained at ground potential and comprises a filament circuit, which may be tungsten or other known substitute therefor.

In an embodiment of the invention, the filament circuit has an operating voltage range of from approximately 30 to approximately 50 Volts (AC), an operating current range of from approximately 7 to approximately 11.5 Amperes, and a maximum filament current from approximately 11.5 Amperes.

The anode 126 and cathode 132 are internally-cooled within the x-ray tube 120. In an embodiment of the invention, the tube is cooled with SYLTHERM HF® (a registered trademark of the Dow Chemical Corporation having headquarters in Midland, Mich.), a commonly available silicone-polymer, low-temperature liquid-phase heat transfer medium.

In an embodiment of the invention, the tube 120 has a maximum output of approximately 220 KeV and a continuous power output of up to approximately 16-20 kW at 100% duty cycle for an x-ray energy output in the range of from approximately 10 KeV to approximately 220 KeV (220 kVp, anode-to-ground). However, in other embodiments, tubes may be available with maximum outputs up to 440 KeV.

In an embodiment of the invention, minimum operating flow rates of the cooling fluid for the energized tube 120 are: 10 gpm with a pressure drop of 6.9 kPa for the anode 126 and 1 gpm with a pressure drop of 6.9 kPa for a cathode jacket. Additionally, in an embodiment of the invention a maximum heat generation of the tube 120 may be approximately 16,500 Watts. In other embodiments of the invention, a maximum heat generation of the tube 120 may be approximately 20 KW, however it is contemplated that future tubes produced will have a maximum heat generated up to 32 KW.

In an embodiment of the invention, the anode 126 is sufficiently cooled by water or other suitable medium via a cooling circuit 134 including a heat exchanger 136 disposed proximate the anode 126 and the cathode 132. Of course, other conventional cooling apparatus and means known to those of skill in the art may also be employed as necessary.

In operation, the electrons e– produced at the cathode 132 are, by means of magnets (not shown) such as is known in the art, bent oppositely towards the anode 126. The accelerated electrons e– are not focused on a particular location on the anode 126. Rather, the path of these electrons e– between the cathode 132 and the anode 126 is expanded such that the x-ray beam 138 produced when the electrons e– strike the target anode combination has a greater area than that associated with conventional x-ray tubes.

By reason of this configuration, the x-ray tube 120 does not generate as great a heat density in the anode 126 as conventional x-ray tubes, and so the anode 126 may be non-rotating.

In order to further increase the area of the x-ray beam 138, the anode 126 is preferably positioned as close as possible to the outlet end (beam window) 122 of the tube 120. The x-ray tube is, by reason of this design, more energy efficient as a greater fraction of the energy converted into x-rays comprises the emerging x-ray beam 138. For whereas the x-rays comprising the emerging x-ray beam 138 in conventional x-ray tubes is approximately 2% of x-rays produced, the x-ray tube 120 of the invention employs x-rays in the emerging x-ray beam that are greater than 20% of the x-rays produced.

In operation, the x-ray beam 138 is preferably propagated along the longitudinal axis of the tube 124 and emerges through an opening at the outlet end 122. According to this arrangement, an x-ray tube 120 is provided which is smaller in transverse dimensions than conventional x-ray tubes, and so may be more easily incorporated into foodstuff irradiation apparatus such as hereinafter described in several embodiments.

In order to maximize the emission of low-energy x-rays from the apparatus as described, it is further preferred to eliminate those filtration means found in conventional x-ray tubes, including aluminum sheets, oils, thick beam exit windows, and other means employed to eliminate low-energy x-rays from the emerging beam. Thus, the x-ray tube is characterized by an absence of filters of filtering from an x-ray beam propagated by the at least one x-ray tube x-rays.

In one embodiment, at least one x-ray source provided is capable of a maximum continuous power output of approximately 16 kW at 100% duty cycle to thereby continuously emit low-energy x-rays have energies of from approximately 10 KeV and up to a maximum of approximately 440 KeV. Further, according to this embodiment, the low-energy x-rays emitted by the at least one x-ray source to which the article is exposed are primarily bremsstrahlung-type x-rays characterized by a continuous range of energies from that of the most energetic electron downwards, this range of energies being of from approximately 10 KeV up to approximately 440 KeV.

The inventors hereof have surprisingly and unexpectedly discovered that non-filtered bremsstrahlung-type x-rays having a continuous range of energies of from approximately 10 KeV up to a maximum of approximately 440 KeV are capable of irradiating a variety of articles to kill pathogenic and non-pathogenic organisms at a much lower dose than that necessary using gamma sources such as Cobalt and Cesium, including being capable of irradiating foodstuffs in satisfaction of government regulations at a lower accumulated dosage than characterizes existing methods, and further without adversely affecting product taste.

In an embodiment of the invention, the inside edge penumbra angle for the tube is 98 degrees total divergence which converts to 49 degrees for one side. This results in the widest diverging beam x-ray tube known to date.

In an embodiment of the invention, each tube's x-ray beam provides circular, full-umbra coverage of 40 cm in diameter with irradiated articles positioned 10 cm from the beam window.

Figure 3:
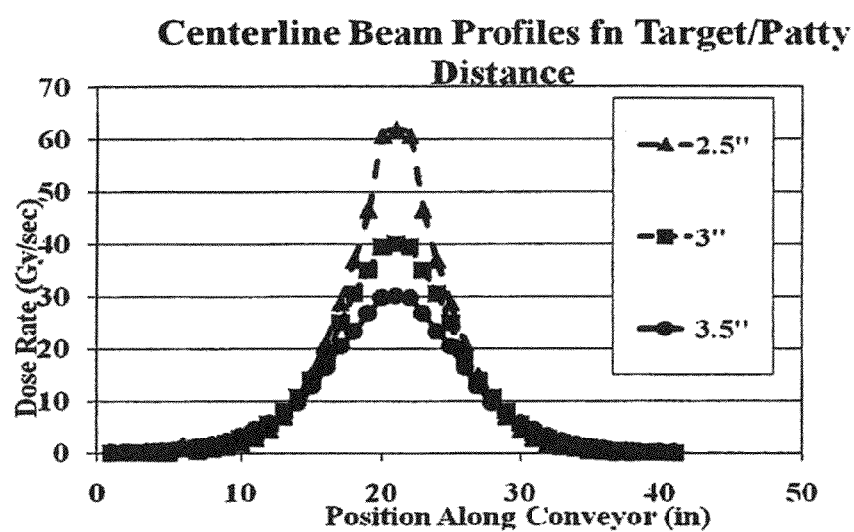
FIG. 3 graphically illustrates dose profile along the beam center line for a single tube as a function of target/article distance.

Illustrated in an embodiment of the invention in FIG. 3 is the integrated dose rate profile along a length of a conveyor parallel to direction of travel for a single tube disposed within an irradiation chamber as a function of target-product distance.

The inventors hereof have surprisingly and unexpectedly discovered that non-filtered x-rays within a continuous spectrum of energies of from approximately 10 KeV up to a maximum of approximately 440 KeV are capable of irradiating foodstuffs in satisfaction of government regulations at a dosage that does not produce significant radiolytic products, provides the government guided reduction in pathogens at a lower total dose, and further without adversely affecting product taste.

It will be understood, with reference to the foregoing, that the rate of movement through the passageway and past the x-ray field(s) of the foodstuff or other article being irradiated will be dictated by the necessity of ensuring proper dosing, which in turn is a function of the intensity of the x-ray field, the x-ray energy, the density and thickness of the product, and the duration of exposure.

Scatter is another factor that will increase the dose to product. The radiation that is not absorbed in the product will interact with the walls of the irradiation chamber and partially scatter back from the chamber surfaces. In addition, scatter in the product will also increase the dose to the product outside the direct beam.

Figure 1:
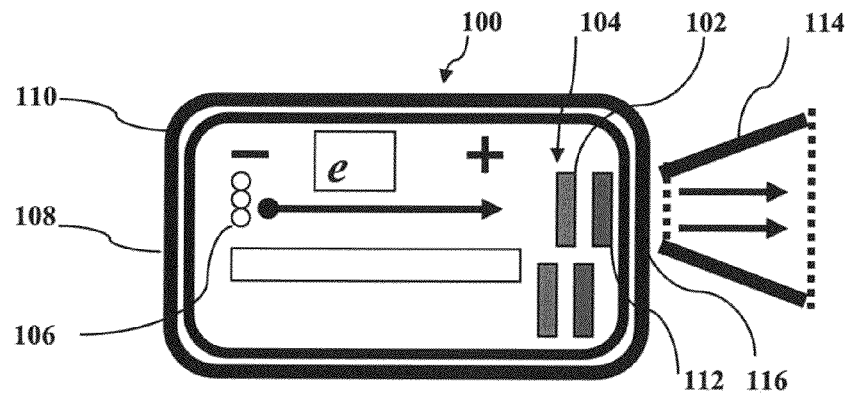
FIG. 1 illustrates a prior art x-ray tube.
Figure 4:
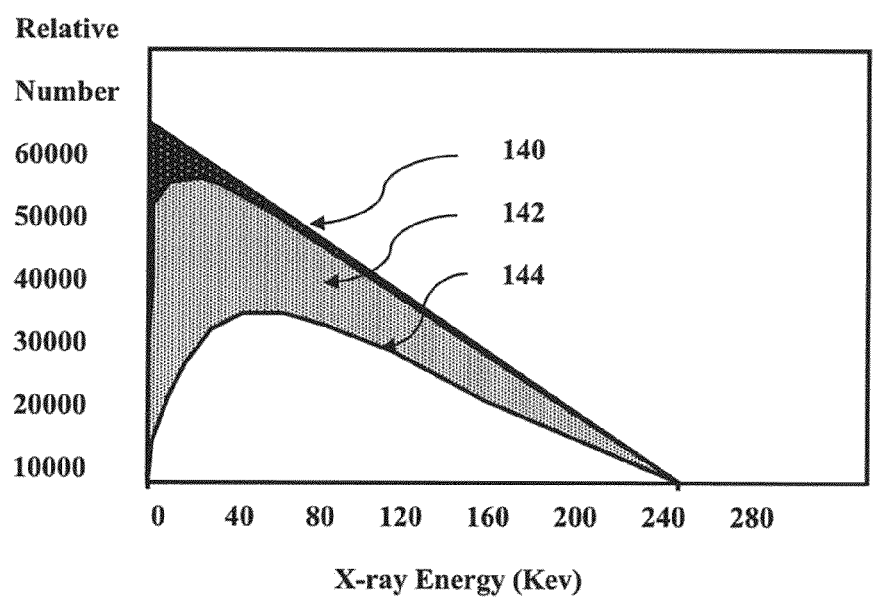
FIG. 4 graphically illustrates the integrated dose rate profile along the conveyor as a function of target/product distance.

Turning now to FIG. 4, a graph is illustrated which depicts the output beam of an x-ray tube such as described hereinabove in reference to FIG. 2 with the output beam of a conventional x-ray tube such as described in reference to FIG. 1. The energy spectrum shows only the bremsstrahlung x-rays as the number of characteristic x-rays represent a very small fraction of the total x-ray population. More particularly, the compared data comprise the relative number of x-rays generated at each energy. In this example, the energy spectra of both tubes ranges from approximately 1 KeV to approximately 250 KeV for purposes of meaningful comparison, although, as previously indicated, the employment of low-energy x-rays was heretofore unknown for the irradiation of foodstuffs. As compared to the theoretical energy spectrum (comprising the sum of the areas in solid black 140, grey 142, and white 144) achievable from each of the compared x-ray tubes, it will be appreciated that conventional x-ray tubes (the energy spectrum of which comprises the area in white) filter out a significant portion of x-ray energies. In contrast, the x-ray tube disclosed hereinabove will be seen to have an energy spectrum (comprising the sum of the areas in grey and white) insubstantially different from the theoretical energy spectrum.

Figure 36:
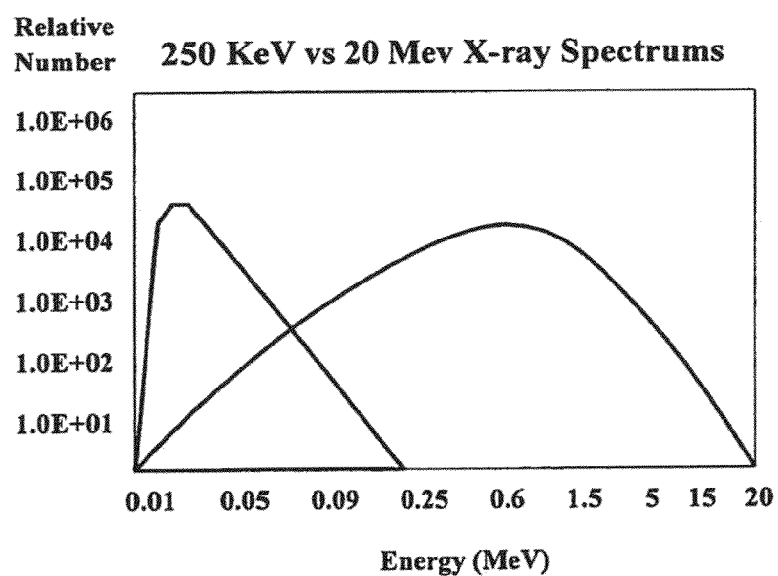
FIG. 36 graphically illustrates a two hundred and fifty KeV x-ray spectrum (left) compared to a twenty MeV spectrum (right).

As shown in FIGS. 3 and 36, an x-ray spectrum comprehending the energies of conventional food irradiation methods not only comprehends energies significantly beyond the upper limits contemplated by the instant invention (20 MeV), but further filters out a significant portion of the energy spectrum employed by the invention.

The output of each x-ray tube is adjustable in order to vary the spectrum of energies to which the items being irradiated are exposed. Accordingly, the maximum energy of the x-ray spectrum of each one x-ray source may be selected according to the article being irradiated and, as described elsewhere herein, may further be selected according to the number of x-ray sources provided.

As used herein, "approximately 10 KeV" is intended to comprehend energies as far below 10 KeV as low as 1 KeV as possible given the filtration inherent in any x-ray source exit window (conventionally made of beryllium). The maximum energy of the x-ray spectrum of the at least one x-ray source to which the article is exposed is selected according to the article being irradiated so as to maximize the amount of x-ray radiation which incompletely penetrates the article.

In recognition of this aspect of the present invention, the efficacy of the invention may be further heightened by selecting the maximum energy of the x-ray spectrum of the at least one x-ray source to which the article is exposed according to the article being irradiated so as to maximize the amount of x-ray radiation which incompletely penetrates the article.

Generally, such maximization is achieved by adjusting the spectrum of energies of the at least one x-ray source according to the thickness and density of the article being irradiated, thickness and density being known limiting variables in respect of the maximum penetration achievable by x-ray photons of any given energy level. Thus, where only a single x-ray source is provided, the energy spectrum thereof is such as will provide at least the desired dose of radiation to the entirety of the article being irradiated, in view of that article's density and thickness.

Thus, the maximum energy selected for each x-ray source may be lower than the maximum energy selectable according to the article being irradiated, and the period of time to provide the at least predetermined dose of radiation is dependent upon the number of x-ray sources provided.

However, where two or more x-ray sources are provided, the maximum energy of the spectrum of each x-ray source may be selected either: (a) to maximize the penetration of the radiation through the product to be irradiated, or (b) and/or to maximize the uniformity of the dose throughout the product.

According to (a), each of the multiple x-ray sources produces energies with a spectrum capable of penetrating only a portion of the article, with all of the x-ray sources collectively dosing the entire area of the article to the at least predetermined dose of radiation. Per this approach, the period of time to provide the at least predetermined dose of radiation to the article is dependent upon the number of x-ray sources provided and the speed of the product through the radiation field.

According to (b), on the other hand, each of the multiple x-ray sources produces energies independently capable of providing a portion of the desired dose of radiation to each area of the article, such that the at least predetermined dose can be realized in a period of time inversely proportional to the number of such x-ray sources, their orientation, and the speed of the product through the irradiation field.

Per one embodiment, the step of providing at least one x-ray source comprises providing two or more x-ray sources, and wherein further the maximum energy of the spectrum of each said x-ray source is selected such that the period of time to provide the at least predetermined dose of radiation to the article to be irradiated decreases as the number of x-ray sources provided increases.

By the provision of a plurality of such x-ray sources emitting low-energy x-rays having energies in the range of from approximately 10 KeV to approximately 220 KeV or up to a maximum of 440 KeV at a continuous power output of 16 kW at 100% duty cycle, the aforedescribed apparatus is capable of moving articles through the irradiation zone at a first velocity ranging between 0.5-10" per second depending upon the customer requirements, tube specifications, and foodstuff being irradiated while providing a dose of radiation to such articles that achieves at least a predetermined reduction in the initial organism population.

In one embodiment thereof, at least eight x-ray sources are provided, and the at least first velocity is approximately in the range of 2" to 8" per second when the article being irradiated is lettuce, depending upon the type of lettuce and the size of the lettuce packaging.

With reference now being had to FIGS. 7-28, several exemplary food irradiating apparatuses for carrying out the methodology of the present invention are diagrammatically illustrated. The several exemplary food irradiating apparatuses disclosed herein include configurations that in operation provide for maximum dose uniformity, safety, product throughput, and reliability.

With reference now being had to FIG. 15-18, several exemplary food irradiating apparatus tube configurations inside the irradiation chamber for carrying out the methodology of the present invention are diagrammatically illustrated.

In each of the embodiments disclosed in FIGS. 7-28, the apparatus may include one or more x-ray tubes according to the configuration described above in relation to any of FIGS. 7-10. However, the several apparatus shown in FIGS. 7-10 are not intended to be so limited. Selected arrangements of x-ray sources in an irradiation zone defined within an irradiation chamber. The x-ray sources may be arranged in one direction either above or below a conveyor (shown in FIGS. 7-10), in opposing pairs positioned above and below the conveyor, (shown in FIGS. 11-13) or offset regions above and below the conveyor (shown in FIGS. 14-18).

Figure 5:
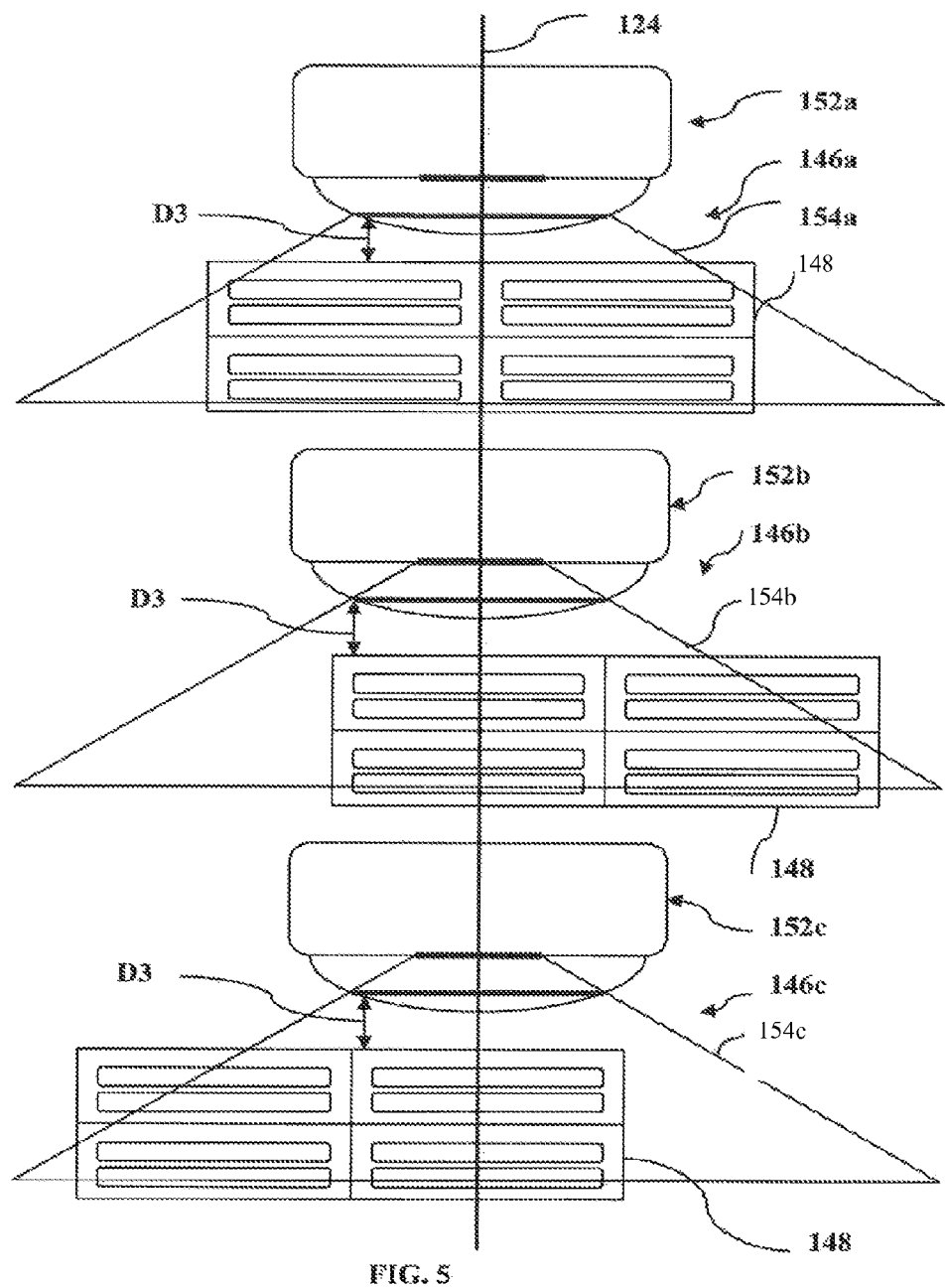
FIG. 5 illustrates a physical representation of how three different lateral positions of x-ray tubes differ in each tube's respective irradiation of a product.

FIG. 5 illustrates a physical representation of how the three different lateral positions of x-ray tubes disposed within an irradiation chamber with respect to a conveyor center-line along a central longitudinal axis of a conveyor differ in each tube's respective irradiation of a product (illustrated here are boxes of beef patties). These positions are also shown in FIG. 7-10. The top illustration 146a within FIG. 5 shows the centering of the product 148 below a center-line 124 tube 152a. The middle illustration 146b shows the arrangement of the product 148 under the left oriented tube 152b and the next tube illustration 146c shows the arrangement of the product 148 under the right oriented tube 152c. As can be seen, the product receives overlapping doses from the various beams 154a, 154b, 154c emitted respectively from tubes 152a, 152b, 152c.

Figure 6:
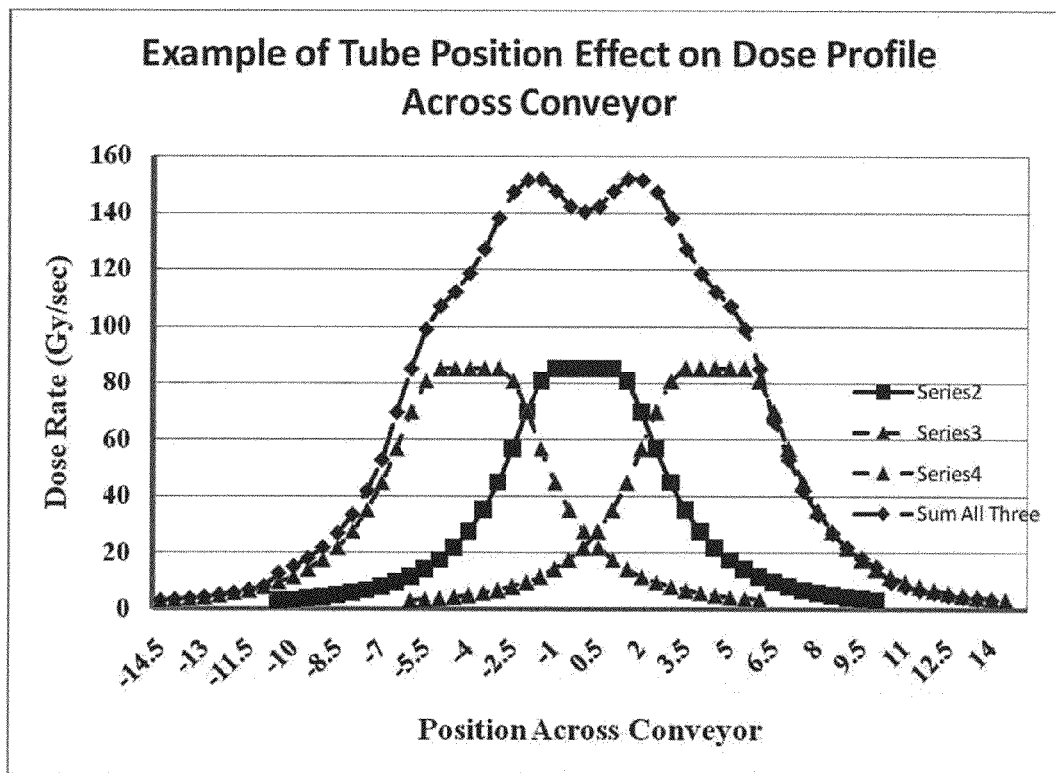
FIG. 6 graphically illustrates a physical representation of the dose profiles of three different lateral positions of x-ray tubes and how they sum to a total dose profile across a conveyor.

FIG. 6 graphically illustrates how the dose profiles across each beam looks with respect to the cross-section of the conveyor and how the three beams sum up to provide a total dose profile across the conveyor. The number of tubes and their placement across the conveyor is determined in order to maximize the uniformity of the dose across the product and is dependent on the product shape and density. Each product requires its own particular design.

In the several embodiments of X-ray tube arrangements within the irradiation chamber diagrammatically illustrated in FIGS. 7-10, a plurality of x-ray tubes may be oriented a predefined distance above the conveyor such that the x-ray field being propagated into the foodstuff is oriented downwardly towards an upper surface of the foodstuff and towards an upper surface of the conveyor accordingly.

In the several embodiments of tube arrangements within the irradiation chamber diagrammatically illustrated in FIGS. 7-10, the plurality of tubes may be oriented a predefined distance below the conveyor such that the x-ray field being propagated into the foodstuff is oriented upwardly towards a lower surface of the foodstuff and towards a lower surface of the conveyor accordingly.

FIG. 7 diagrammatically illustrates a cross-sectional view a plurality of single-ended x-ray tubes 152a, 152b, 152c disposed within an irradiation chamber 156 wherein there are an equal number of tubes arranged off-center a predefined distance D1 from a conveyor central longitudinal axis 158a and at least one or an odd number of tubes arranged along the conveyor central longitudinal axis 158a, and wherein each of the plurality of tubes are equidistant to an adjacent tube along either a first 158b, second 158c, or third 158a longitudinal axis 158b, 158c, 158a, respectively of the conveyor 160, the x-ray field being propagated into the foodstuff transported on the conveyor in a direction at an absolute value of angle ranging between greater than 0° and less than 180° to the path of travel of the conveyor 160 transporting the foodstuff being irradiated.

In particular as shown in FIG. 7, the plurality of tubes include a first set 162b in an insert of x-ray tubes 152b arranged along the first longitudinal axis 158b, a second set 162c of the x-ray tubes 152c arranged along the second longitudinal axis 158c, and at least one third x-ray tube 152a disposed along the third central longitudinal axis 158a of the conveyor 160.

The first set 162b of x-ray tubes 152b is defined by two first x-ray tubes 152b disposed along the first longitudinal axis 158b offset but parallel to the third central longitudinal axis 158a of the conveyor 160 wherein the conveyor first longitudinal axis 158b is coaxial with a first transverse axis 164b transverse to a respective first longitudinal tube axis (not shown) associated with each of the two first tubes 152b.

The second set 162c of x-ray tubes 152c is defined by two second x-ray tubes 152c disposed along the second longitudinal axis 158c offset but parallel to the third central longitudinal axis 158a of the conveyor 160 wherein the conveyor second longitudinal axis 158c is coaxial with a second transverse axis 164c transverse to a respective second longitudinal tube axis (not shown) associated with each of the two second tubes 152c.

The two first x-ray tubes 152b are disposed off-center of the conveyor longitudinal axis 158a on a first side (left side as shown in FIG. 7) that is off-center from the third central longitudinal axis 158a and the second two x-ray tubes 158c are located an equal opposing distance from the third central longitudinal axis 158a of the conveyor 160 along a second side of the longitudinal axis 158a of the conveyor 160, and wherein the at least one third x-ray tube 152a has a third transverse tube axis 164a coaxial with the third central longitudinal axis 158a of the conveyor 160 and is transverse to a respective third longitudinal tube axis (not shown) associated with the third tube 152a.

In another embodiment of the invention, a plurality of tubes ranging between five and 10 may be arranged in a like manner or pattern as shown in FIG. 7, such that an equal number of first and second tubes 152b, 152c, respectively within each set of first and second tubes 162b, 162c, respectively are spaced in a repeated manner and are each laterally (in a direction transverse to each conveyor longitudinal axis 158a, 158b, 158c) offset from the conveyor third central longitudinal axis 158a, and such that at least one third tube disposed along the conveyor third central longitudinal axis 158a is associated with each repeating of first and second sets of tubes 162b, 162c, respectively. Any combination of patterns of first and second sets of tubes 162b, 162c in combination with at least one third tube 152a may be used to form a tube pattern group 166a of five tubes that may be repeated up to two tube pattern groups 166a of five tubes for a total of up to 10 tubes.

FIG. 8 diagrammatically illustrates a cross-sectional view a plurality of single-ended x-ray tubes 152b, 152c disposed within an irradiation chamber 156 wherein there are an equal number of tubes arranged off-center a predefined distance from a conveyor central longitudinal axis 158a, and wherein no tubes are disposed along the conveyor central longitudinal axis 158a, the x-ray field being propagated into the foodstuff transported on the conveyor in a direction at a predefined angle ranging between greater than 0° to less than 0180° with respect to or generally perpendicular to the path of travel of the conveyor transporting the foodstuff being irradiated.

FIG. 8 diagrammatically illustrates an alternative embodiment of single ended x-ray tubes disposed of the predefined distance from a conveyor 160 defining a path of travel for foodstuff being radiated, the x-ray field being propagated into the foodstuff transported on the conveyor in a direction at an absolute value of angle ranging between greater than 0° and less than 180° to the path of travel of the conveyor transporting the foodstuff being irradiated. In particular, two sets of tubes 162b, 162c equidistant from the conveyor third central longitudinal axis 158a are disposed along conveyor first and second longitudinal axes 158b, 158c, respectively parallel to the conveyor third central longitudinal axis 158a and offset an opposing equal distance D1 from the conveyor third central longitudinal axis such that the conveyer first longitudinal axis offset the predefined distance D1 from the central longitudinal axis 158a of the conveyor 160 is projected through a respective first transverse tube axis 164b of each of the respective first set of tubes 162b perpendicular to an associated first longitudinal tube axis (shown as 124 in FIG. 2) of each of the first set of tubes 162b, and the conveyor second longitudinal axis 158c offset the predefined distance D1 from the third central longitudinal axis 158a of the conveyor 160 is projected through a respective second transverse tube axis 164c of each of the respective second set of tubes perpendicular to an associated second longitudinal tube axis (shown as 124 in FIG. 2) of each of the second set of tubes.

In another embodiment of the invention, a plurality of tubes 152b, 152c ranging between two and 18 may be arranged in a like manner as shown in FIG. 8, such that an equal number of first and second sets of tubes 152b, 152c, respectively are spaced in a repeated manner and are each laterally offset (in a direction transverse to each conveyor longitudinal axis 158a, 158b, 158c) from the conveyor central longitudinal axis 158a. Each grouping of first and second sets of tubes 162b, 162c, respectively form a tube pattern group 166b wherein each tube pattern group includes at least one first and second tubes up to a total of 18 tubes. Each set of first and second tubes within each tube pattern group includes between two and nine tubes are spaced in a repeated manner and are each offset from the conveyor third central longitudinal axis.

Figures 9, 10:
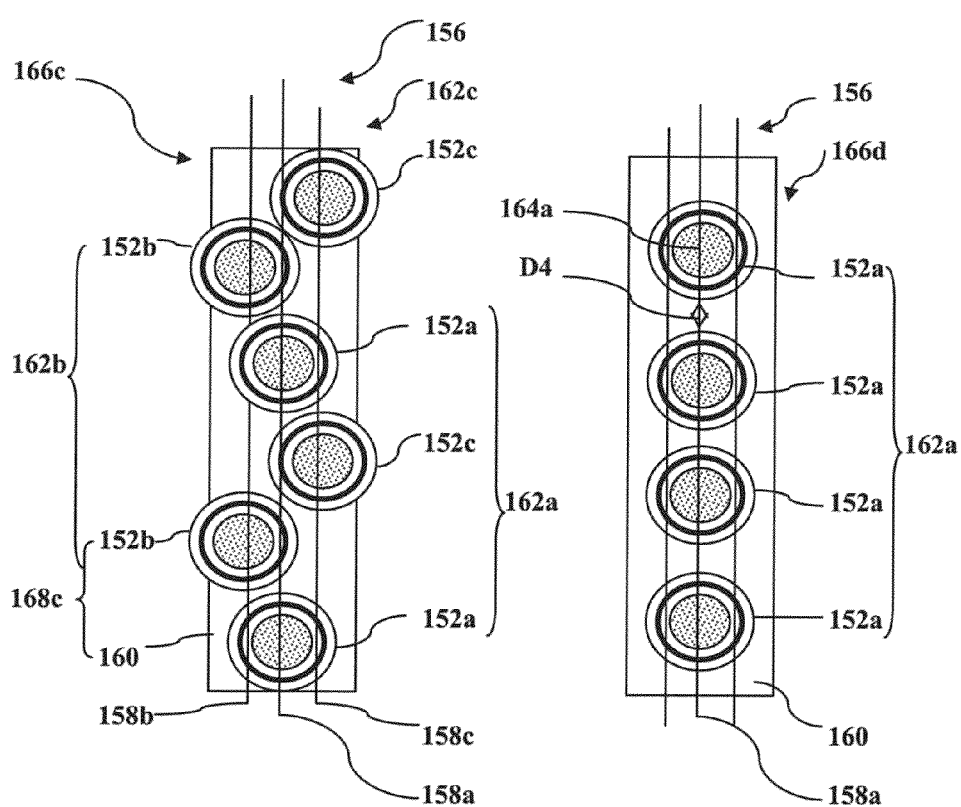

FIG. 9 diagrammatically illustrates a cross-sectional view of a plurality of single-ended x-ray tubes 152a, 152b, 152c disposed within an irradiation chamber 156 wherein there are an equal number of tubes arranged off-center a predefined distance on each side from a conveyor central longitudinal axis 158a, and wherein an equal number of tubes are disposed along the conveyor central longitudinal axis 158a, the x-ray field being propagated into the foodstuff transported on the conveyor 160 in a direction at a predefined angle ranging between greater than 0° to less than 180° with respect to or generally perpendicular to the path of travel of the conveyor 160 transporting the foodstuff being irradiated.

In the embodiment of the invention as shown in FIG. 9, the plurality of tubes 152a, 152b, 152c include a first set 162b of x-ray tubes arranged along a conveyor first longitudinal axis 158b, a second set 162c of tubes 152c arranged along a conveyor second longitudinal axis 152c, and a third set of tubes 162c disposed along a third central longitudinal axis 158a of the conveyor 160, such that an equal number of first, second, and third tubes 152a, 152b, 152c are each arranged along a respective first, second, and third conveyor axis 158b, 158c, 158a.

In another embodiment of the invention, a plurality of tubes 152a, 152b, 152c ranging between six and 18 may be arranged in a like manner or pattern as shown in FIG. 9, such that an equal number of first and second tubes 152b, 152c within the first and second sets 162b, 162c of tubes 152b, 152c are each offset a predefined distance D1 from the conveyor third central longitudinal axis 158a, and such that an equal number of third tubes 152a as are within either the first or second set 162b, 162c of tubes 152b, 152c are within a third set 162a of tubes 152a disposed along the conveyor third central longitudinal axis 158a, respectively, are spaced in a repeated manner or pattern to define a tube pattern group 166c of first, second and third sets 162b, 162c, 162a, respectively of tubes 152b, 152c, 152a.

Additionally, the tubes may be positioned in any tube pattern group of three or six tubes configurations along each respective first, second and third longitudinal axis 158b, 158c, 158a as long as equal numbers of tubes 152a, 152b, 152c within the tube pattern group 166c are disposed on each axis and such that each tube pattern group 166c, 168c (shown in FIG. 9) ranges between one set of three or six tubes 152a, 152b, 152c that are repeated in a similar pattern up to six repeating tube pattern groups of three tubes and three repeating tube pattern groups of six tubes for a total of up to 18 tubes.

As described with respect to the tube configurations shown in FIGS. 7-9, the tube arrangements including tubes offset from the conveyor central longitudinal axis are to provide a flatter radiation dose field across the conveyor width.

FIG. 10 diagrammatically illustrates a plurality of single-ended x-ray tubes 152a disposed a predefined distance D3 (as shown in FIG. 5) from a conveyor defining a path of travel for a foodstuff being irradiated, the x-ray field being propagated into the foodstuff being transported in a conveyor 160 in a direction at an absolute value of an angle ranging between greater than 0° and less than 180° to the path of travel of the conveyor 160 transporting the foodstuff 148 (shown in FIG. 5) being irradiated.

In particular, the embodiment shown in FIG. 10 illustrates a plurality of x-ray tubes 152a arranged in an irradiation chamber 156 in-line along a central longitudinal axis 158a of a conveyor 160 such that the central longitudinal axis 158a of the conveyor 160 projects through and is co-axial with a third transverse tube axis 164a transverse to a respective central longitudinal tube axis (shown as 124 in FIG. 2) associated with each of the plurality of x-ray tubes 152a.

In another embodiment of the invention, a plurality of tubes 152a within a tube 162a defining a tube pattern group 166d ranging between one and up to 18 tubes may be centrally aligned an equal distance D4 from one another in-line along the conveyor central longitudinal axis 158a in a like manner as shown in FIG. 10.

Figure 11:
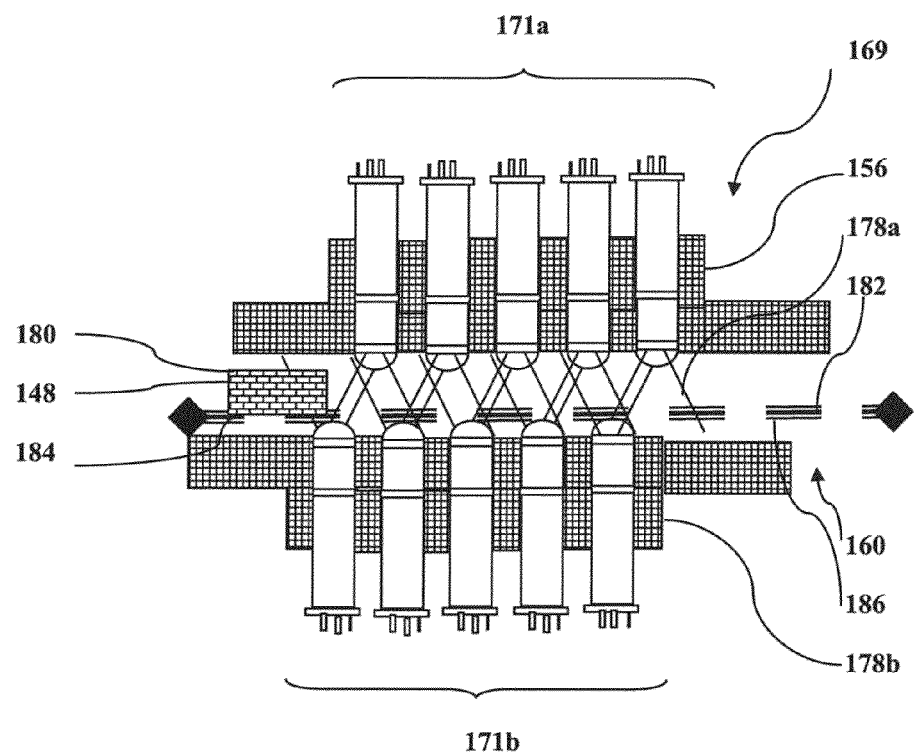
FIGS. 11-13 illustrate various opposing tube configurations with respect to the orientation of the tubes described with respect to FIGS. 7-10.
Figure 12:
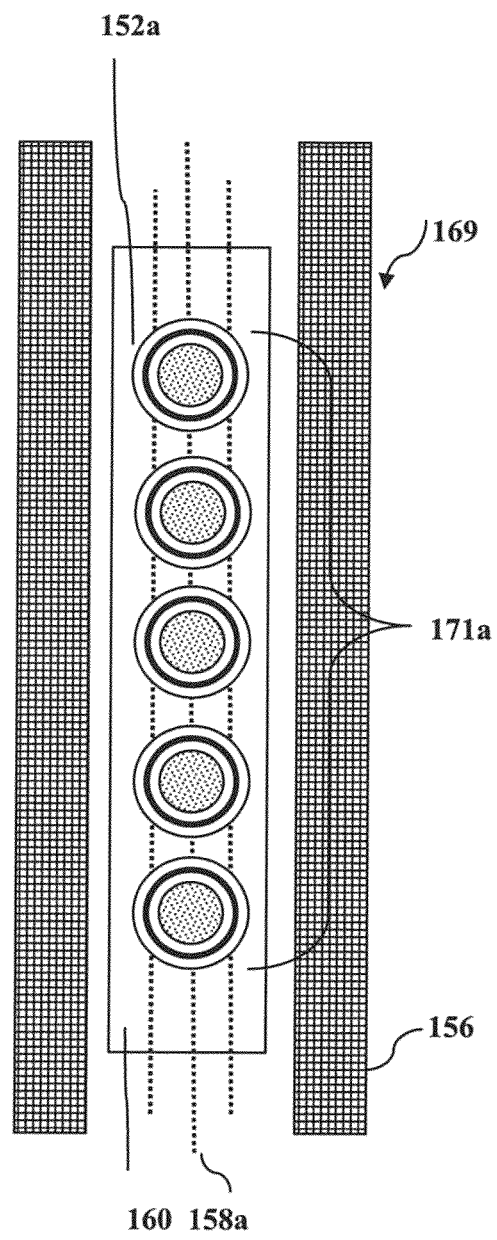
Figure 13:
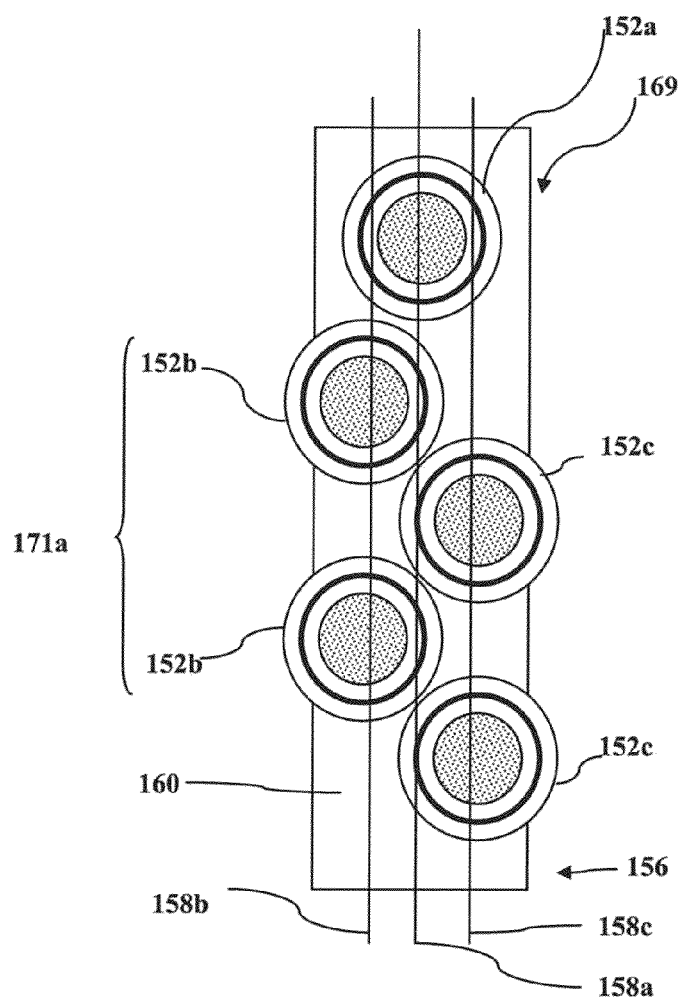

The tube configurations described with respect to FIGS. 7-10 may be used to arrange any of the pairs of opposing sets of tubes in any of the radiation chambers described with respect to FIGS. 11-13 or offset sets of tubes in any of the radiation chambers described with respect to FIGS. 14-18. Depending on the tube configuration used, a total number of tubes used with respect to the embodiments shown in FIGS. 11 and 14, a total number of tubes used may ranges from 2 and up to 18. Each set of opposing tubes described with reference to FIG. 11 and each set of offset tubes described with reference to FIG. 14 may be arranged in either an in-line configuration along a central longitudinal axis of the conveyor, an off-center configuration offset from the conveyor central longitudinal axis, or a combination thereof.

The opposing configuration of tubes 169 disposed within an irradiation chamber 156 shown in FIG. 11 and additionally in FIG. 12-13 includes a first upper set 171a and a second lower set 171b of tubes, wherein the first upper set 171a of tubes is disposed above the conveyor 160 and are adapted to emit x-rays 178a downwardly towards an upper surface 180 of an article 148 being irradiated and towards an upper side 182 of the conveyor 160, and wherein the second lower set of tubes 171b are offset from the first upper set 171a of tubes and are adapted to emit x-rays 178b towards a lower surface 184 of an article being irradiated and towards a lower side 186 of the conveyor 160.

Figure 14:
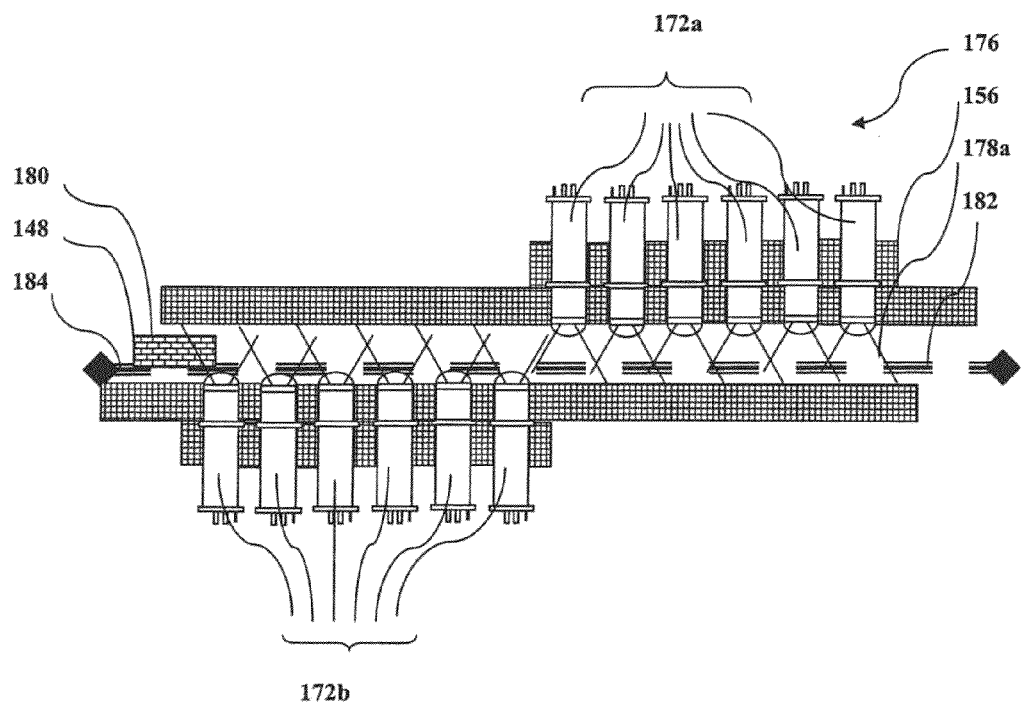
FIGS. 14-18 illustrate various offset tube configurations with respect to the orientation of the tubes described with respect to FIGS. 7-10.

The off-set configuration of tubes 176 disposed within an irradiation chamber 156 shown in FIG. 14 and additionally in FIG. 15-18 includes a first upper set 172a and a second lower set 172b of tubes, wherein the first upper set 172a of tubes is disposed above the conveyor 160 and are adapted to emit x-rays 178a downwardly towards an upper surface 180 of an article 148 being irradiated and towards an upper side 182 of the conveyor 160, and wherein the second lower set of tubes 172b are offset from the first upper set 172a of tubes and are adapted to emit x-rays 178b towards a lower surface 184 of an article being irradiated and towards a lower side 186 of the conveyor 160.

As shown in FIG. 11, the opposing tubes in each set of tubes 171a, 171b, respectively may be arranged in a staggered configuration (shown in FIG. 11) wherein the central longitudinal axis of each tube within a pair of opposing tubes 152a from each set 171a, 171b each tube including one downward and upward facing tube are oriented such that a respective longitudinal axis of each tube are parallel but are not coaxial or alternatively may be arranged such that each pair of downward and upward facing tubes from tube sets 171a, 171b have a central longitudinal axis that are co-axial.

FIGS. 12-13 depict in diagram an alternate embodiment of the apparatus of FIG. 11, wherein two sets of single-ended x-ray tubes are disposed externally of the conveyor 160, the x-ray tubes arranged in opposition so that their respective x-ray fields are propagated along parallel axes of propagation in opposite directions to thereby create an overlapping x-ray fields across the conveyor 160.

FIG. 12 diagrammatically illustrates a top view of the opposing tube arrangement 169 of the apparatus shown in FIG. 11 wherein the plurality of first upper set 171a of tubes 152a and second lower set 171b of tubes (shown in FIG. 11) are arranged an equal horizontal distance apart from one another in an in-line arrangement aligned along a central longitudinal axis 158a of the conveyor 160 as described with respect to the tube pattern group 166d in FIG. 10.

FIG. 13 diagrammatically illustrates a top view of the embodiment of the apparatus having an opposing tube arrangement 169 of FIG. 11, wherein the tubes 171a, 171b (not shown in FIG. 13) are arranged in a tube pattern group 166a configuration as described with respect to FIG. 7.

In an embodiment shown in FIG. 13, a total of ten opposing x-ray tubes (five top and five bottom shown in FIG. 11) with eight out of the ten tubes (only four of the off-center tubes from the top tube set 171a shown in FIG. 13) being offset a predefined lateral and horizontal distance from the conveyor central longitudinal axis 158a. FIG. 13 illustrates how the top tubes 171a line up with the conveyor 160 along each first, second, and third longitudinal axes 158b, 158c, 158a. As noted with respect to FIG. 7, any of the tube pattern groups 166a of upper and lower sets 171a, 171b, respectively of tubes 152a, 152b, 152c may be arranged as described with respect to FIG. 7 for a total number of tubes ten tubes including five upper and five lower tubes.

FIG. 14 illustrates a side elevational view of a plurality of first single-ended x-ray tubes offset from a respective plurality of second single-ended x-ray tubes each disposed a predefined distance vertical from a conveyor defining a path of travel for a foodstuff 148 being irradiated, the x-ray fields 178a, 178b being propagated into the foodstuff 148 transported on the conveyor 160 in a direction at an absolute value of an angle ranging between 0° and 180° to or perpendicular to the path of travel of the conveyor 160 transporting the foodstuff 148 being irradiated.

The off-set configuration of tubes 176 shown in FIG. 14 and additionally in FIG. 15-18 includes a first upper set 172a and a second lower set 172*b* of tubes, wherein the first upper set 172*a* of tubes is disposed above the conveyor 160 and are adapted to emit x-rays 178*a* downwardly towards an upper surface 180 of an article 148 being irradiated and towards an upper side 182 of the conveyor 160, and wherein a second lower set 172*b* of tubes are offset from the first upper set of tubes and are adapted to emit x-rays 178*b* towards a lower surface 184 of an article being irradiated and towards a lower side 186 of the conveyor 160.

Figure 15:
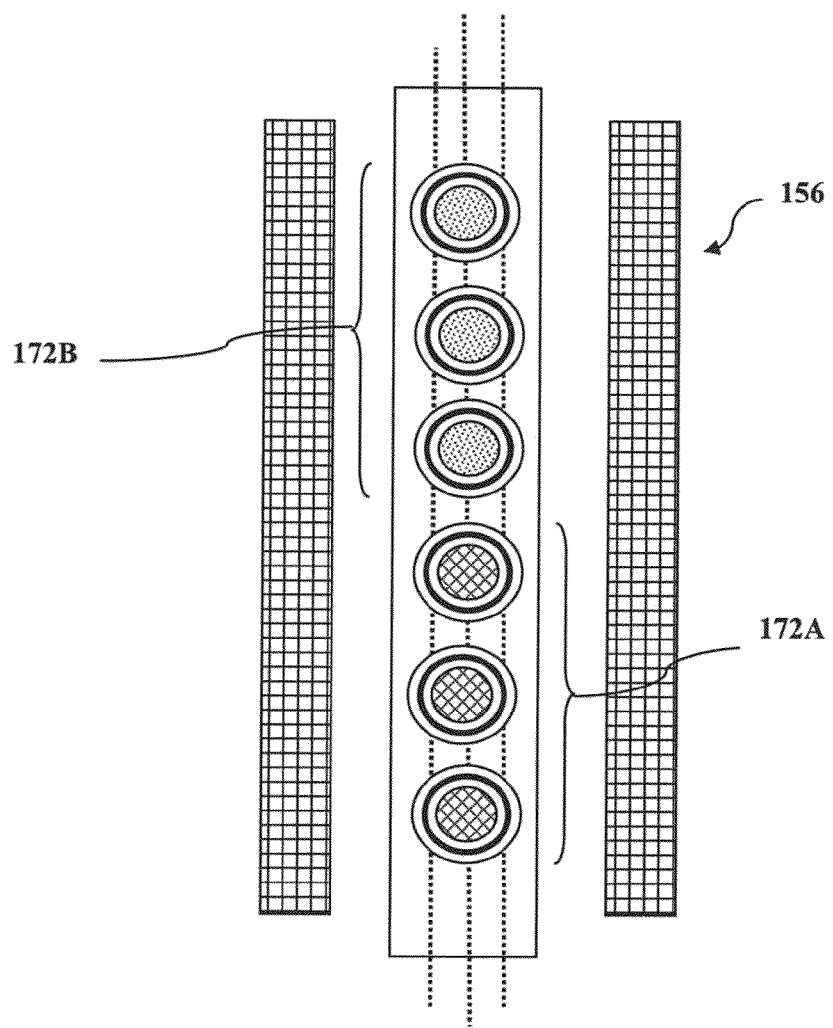

FIG. 15 diagrammatically illustrates a top view of the embodiment of the apparatus of FIG. 14 wherein each first upper set 172*a* and second lower set 172*b* of off-set tubes are arranged in an in-line configuration of tube pattern groups 166*d* similar to that shown in FIG. 10. Equal numbers of tubes in each first upper and lower set may range between one and nine for a total of up to 18 tubes (nine upper tubes and nine lower tubes). As shown in a non-limiting embodiment in FIG. 15, there are three in-line tubes in the first upper set of tubes 172*a* and three in-line tubes second lower set 174*b* of tubes.

Figure 16:
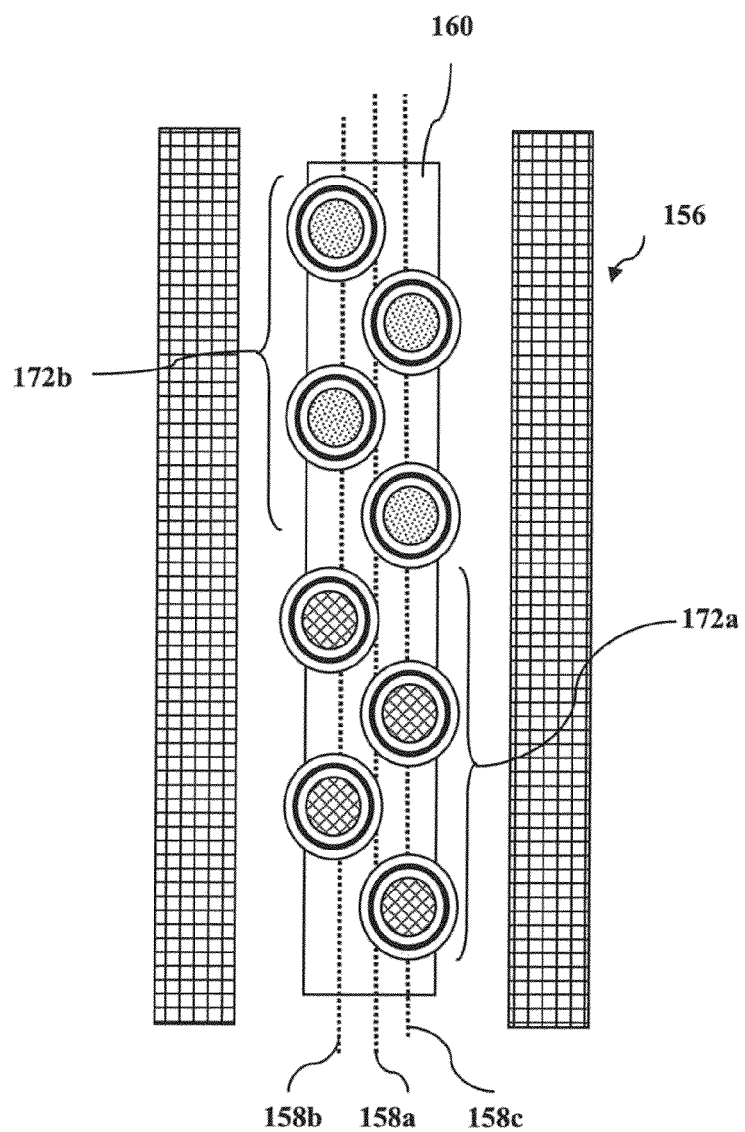

FIG. 16 diagrammatically illustrates a top view of the embodiment of the apparatus of FIG. 14 wherein each first upper set 172*a* and second lower set 172*b* of off-set tubes are arranged within irradiation chamber 156 in an symmetrical configuration along two conveyor longitudinal axes 158*b*, 158*c* each offset an equal lateral (transverse to the conveyor central longitudinal axis 158*a*) distance from the conveyor central longitudinal axis 158*a* in a tube pattern group 166*b* described and shown with respect to or in repeating patterns of the tube patterns 166*b* in FIG. 8.

In particular, FIG. 16 illustrates eight tubes total, including four downwardly facing upper tubes in tube set 172*a* symmetrically disposed a pre-defined vertical distance about the conveyor 160 an equal transverse horizontal distance about the central longitudinal axis 158*a* that are offset from four upwardly facing lower tubes in tube set 172*b* symmetrically disposed a pre-defined vertical distance about the conveyor 160 an equal transverse horizontal distance about the central longitudinal axis 158*a*.

Figure 17:
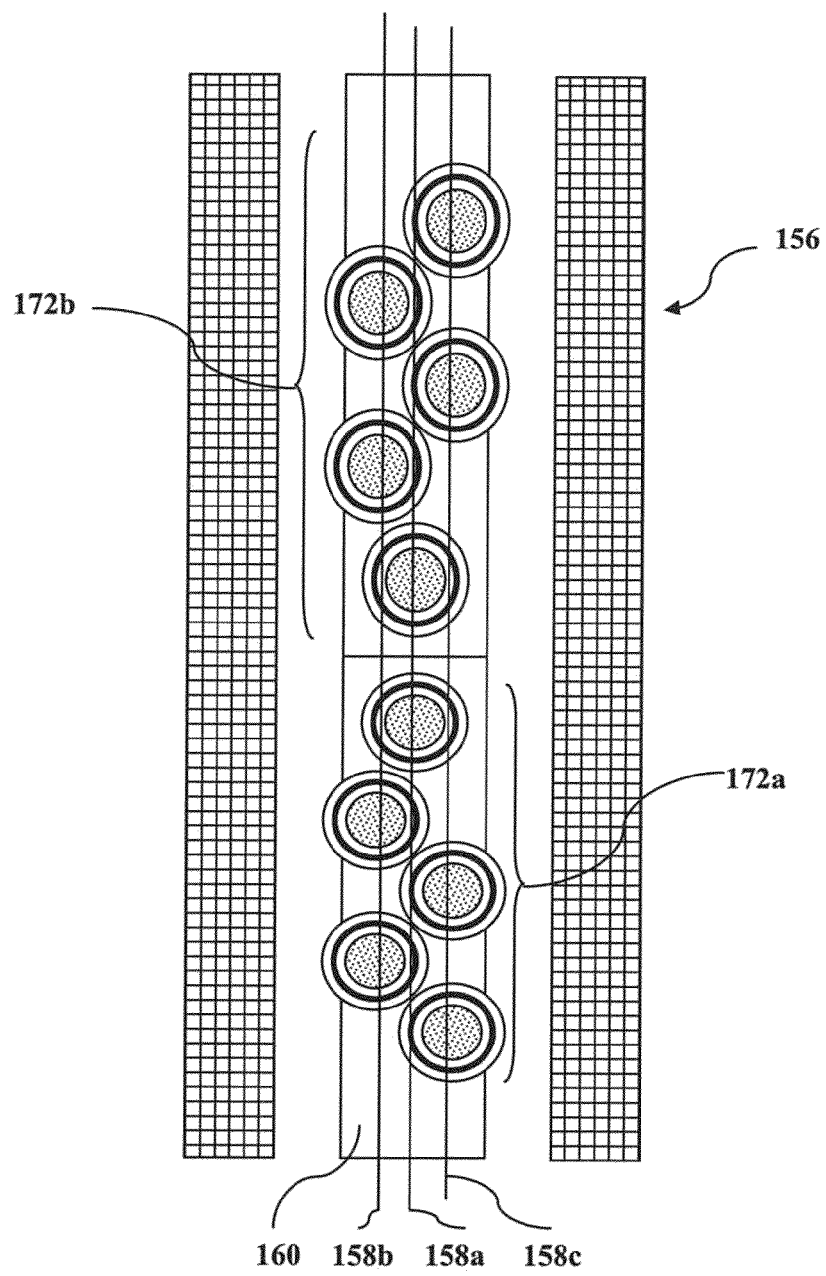

FIG. 17 diagrammatically illustrates a top view of the embodiment of the apparatus of FIG. 14 wherein each first upper set 172*a* and second lower set 172*b* of off-set tubes are each respectively arranged in the irradiation chamber 156 along conveyor first, second, and third longitudinal axes 158*b*, 158*c*, 158*a* of the conveyor 160 in a configuration similar to that shown in FIG. 7 or in repeating tube pattern groups 166*c* of the tubes shown in FIG. 7.

In particular, FIG. 17 diagrammatically illustrates a top view of the embodiment of the off-set tube configuration 176 apparatus of FIG. 14 ten tubes total, including five downwardly facing upper tubes of the first upper tube set 172*a* of tubes arranged are offset from five upwardly facing lower tubes of the second lower tube set 172*b* of wherein each first upper set and second lower set of off-set tubes (shown in FIG. 14) are each respectively arranged in a tube pattern group 166*a* or repeating tube pattern group 166*a* configuration as described and shown with respect to FIG. 7.

Figure 18:
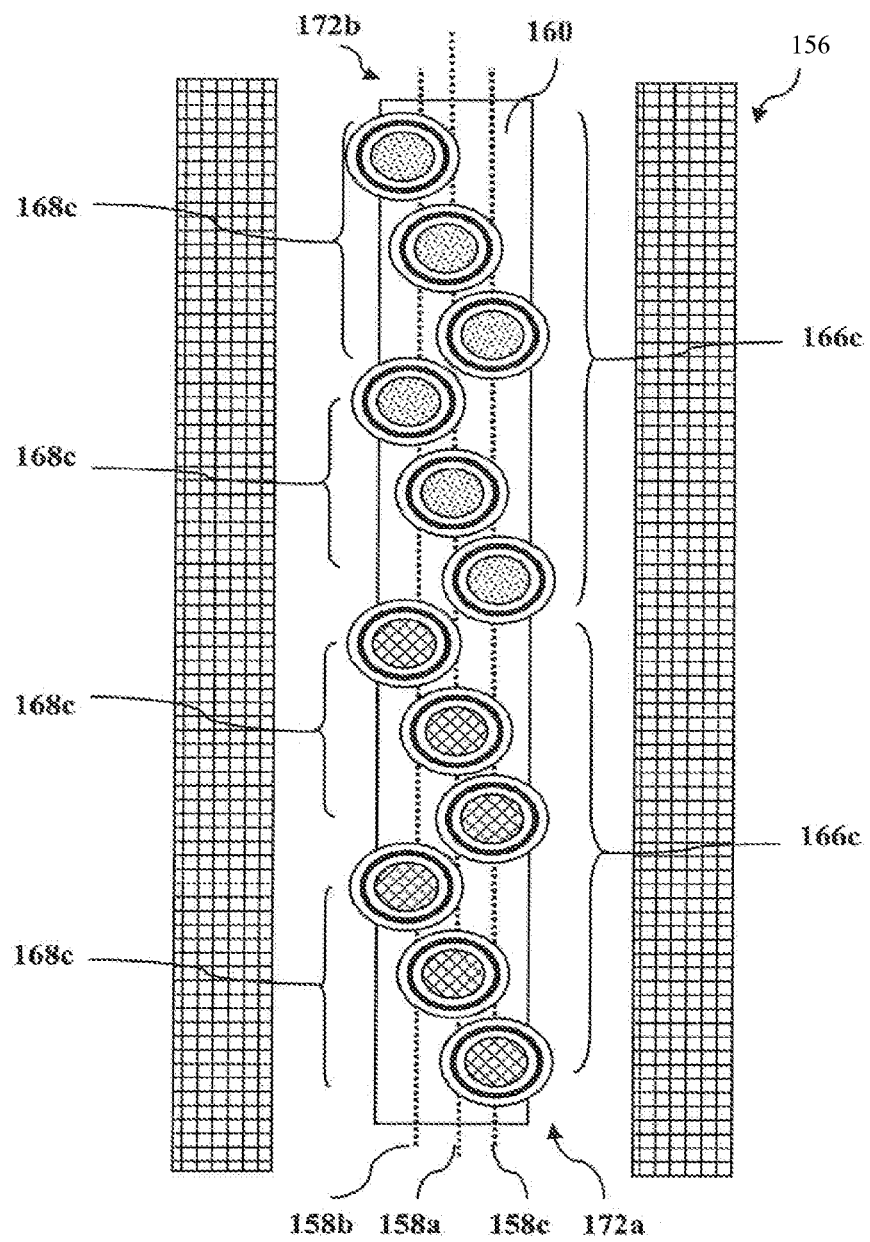

FIG. 18 diagrammatically illustrates a top view of the embodiment of the off-set tube configuration 176 apparatus of FIG. 14 wherein each first upper set 172*a* and second lower set 172*b* of off-set tubes are each respectively arranged within the irradiation chamber 156 along first, second, and third longitudinal axes 158*b*, 156*c*, 158*a* of the conveyor 160 in a tube pattern group 166*c* or repeating tube pattern group 168*c* configuration as described and shown with respect to FIG. 9, wherein equal sets of each respective six upper and second lower sets 172*a*, 172*b* of tubes are each further aligned such that equal numbers of tubes within a first, second, and third sets 162*b*, 162*c*, 162*a* of tubes are respectively aligned along a first, second, and third conveyor longitudinal axis 158*b*, 158*c*, 158*a*.

In particular, FIG. 18 illustrates 12 tubes total, including six downwardly facing upper tubes arranged are offset from six upwardly facing lower tubes wherein each first upper set and second lower set of off-set tubes are each respectively arranged in a tube pattern group 166*c* or repeating tube pattern group 166*c* configuration as described and shown with respect to FIG. 9.

With reference now being had to FIGS. 19-28, several exemplary food irradiating apparatuses for carrying out the methodology of the present invention are diagrammatically illustrated.

According to several embodiments, shown in FIGS. 19-28 exemplary food-irradiating apparatuses are illustrated for carrying out the methodology of the present invention the apparatus, which is particularly well suited to in line irradiation.

In particular, an apparatus for killing pathogenic and non-pathogenic organisms using low-energy x-rays, the apparatus comprising a shielding assembly that maximizes internal deflections to prevent the x-rays from escaping the apparatus enclosing an irradiation zone having inlet portion and an outlet portion and a passageway therebetween, the passageway defining a path of travel for the articles to be irradiated between the inlet and outlet portions; a conveyor assembly for substantially continuously moving the articles to be irradiated through the irradiation zone at least a first velocity; and an irradiation chamber housing at least one x-ray source disposed within the passageway between the inlet and outlet portions in the path of travel of the articles to be irradiated, the at least one x-ray source having a first power level capable of emitting x-rays for a period of time sufficient to provide at least a predetermined dose of radiation to an article and capable of a maximum continuous power output at 100% duty cycle that is selected from within range of from approximately 16 kW to approximately 20 kW to thereby continuously emit low-energy x-rays having energies of from approximately 10 KeV and to approximately 200-220-KeV or alternatively, to a maximum of approximately 440 KeV.

Desirably, the shielding assembly is configured to dissipate the low-energy x-rays emitted from each x-ray source so as to minimize, and most preferably eliminate, the amount of radiation which escapes from the apparatus. To this end, a shielding assembly is disposed about the irradiation zone along path of travel of the closed portion of the conveyor assembly and further may partition the closed portion of the conveyor assembly from the open portion of the conveyor assembly.

The shielding assembly disposed about the irradiation zone absorbs radiation emitted within the irradiation zone and may be made of lead or any other material adapted to effectively absorb all of the irradiation emitted within the irradiation zone.

The shielding assembly may include an external shield disposed about entire apparatus; and a first internal shield forms an x-ray absorbant housing disposed about a plurality of x-ray sources disposed within the irradiation chamber.

Additionally, a second internal shield integrally formed with the external shield partitions an internal region of the irradiation zone from the conveyor assembly open region.

In an embodiment of the invention, the configuration of the geometry of the shielding assembly maximizes the percentage of emitted low-energy x-rays emitted by the at least one x-ray source is carried out in the irradiation chamber. Per another feature of the apparatus, the passageway may be defined by a non-linear configuration or a linear configuration, or a combination thereof the geometry of which maximizes the percentage of emitted low-energy x-rays which are internally deflected and so prevented from exiting the irradiation zone. Additionally the passageway may be defined by an lower and an elevated level to transport articles through the passageway to minimize the floor space the apparatus occupies in accordance with requirements for the apparatus defined by a user.

In practice, it has been discovered that effectively shielding a linear one-level conveyor when employing x-ray sources having high outputs such as described herein is difficult, and so the shield for the associated conveyor assembly may be configured to define a non-linear shape in the form of a substantially T-shaped loop (shown in FIGS. 19-20) or in the form of either a one level conveyor (shown in FIGS. 19-22) or a two level conveyor (shown in FIGS. 23-27, respectively) forming an elongated oval loop, a linear shape, or a combination thereof, wherein the oval loop or linear shape combination may include a two level conveyor thereby maximizing the percentage of emitted low-energy x-rays which are internally deflected and so prevented from exiting the irradiation zone.

The items to be irradiated are moved substantially continuously through the irradiation zone on a powered conveyor the speed of which may be selectively varied in order to adjust the x-ray dosage received by the items as they pass through the irradiation zone.

The conveyor system comprises: at least one conveyor that moves a plurality of articles at least a first velocity through the passageway defined between the inlet and outlet portions of the irradiation zone; an open portion accessing an article transported along the at least one conveyor; and a closed portion housed within the irradiation zone.

In embodiment of the invention, the conveyor defines a path of travel for a foodstuff being irradiated.

In an embodiment of the invention, the conveyor is non-linear and can be removed from invention to be cleaned. In another embodiment, the direction of the conveyor is reversible.

With regard to the apparatuses shown and described with respect to FIGS. 19-27, the irradiation chamber 200a (as shown in more detail in (FIG. 28) includes either the opposing or off-set tube configurations described with respect to FIGS. 11-13 and 14-18, respectively and additionally the tubes within the irradiation chamber 200a may be arranged in any of the tube pattern group configurations shown and described with respect to FIGS. 7-10.

Figure 19:
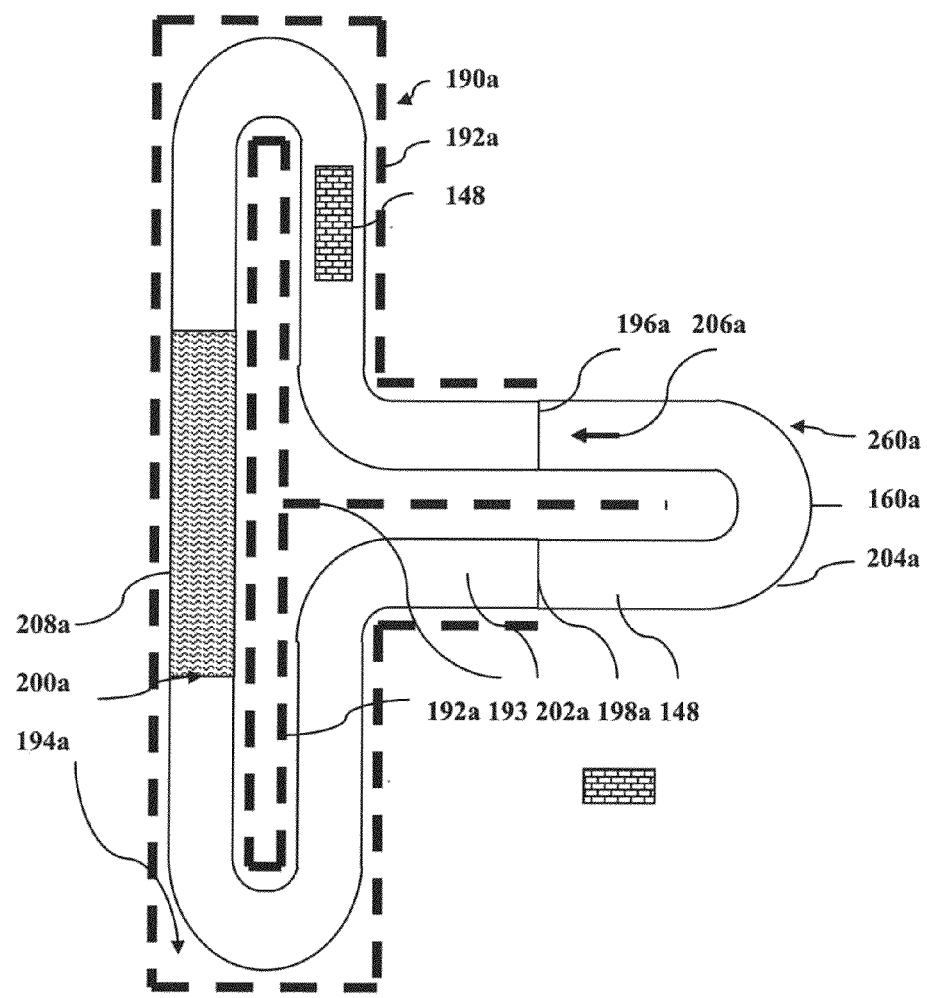
FIGS. 19-20 illustrate a top cross-sectional view of an apparatus having a T-shaped floor plan.
Figure 20:
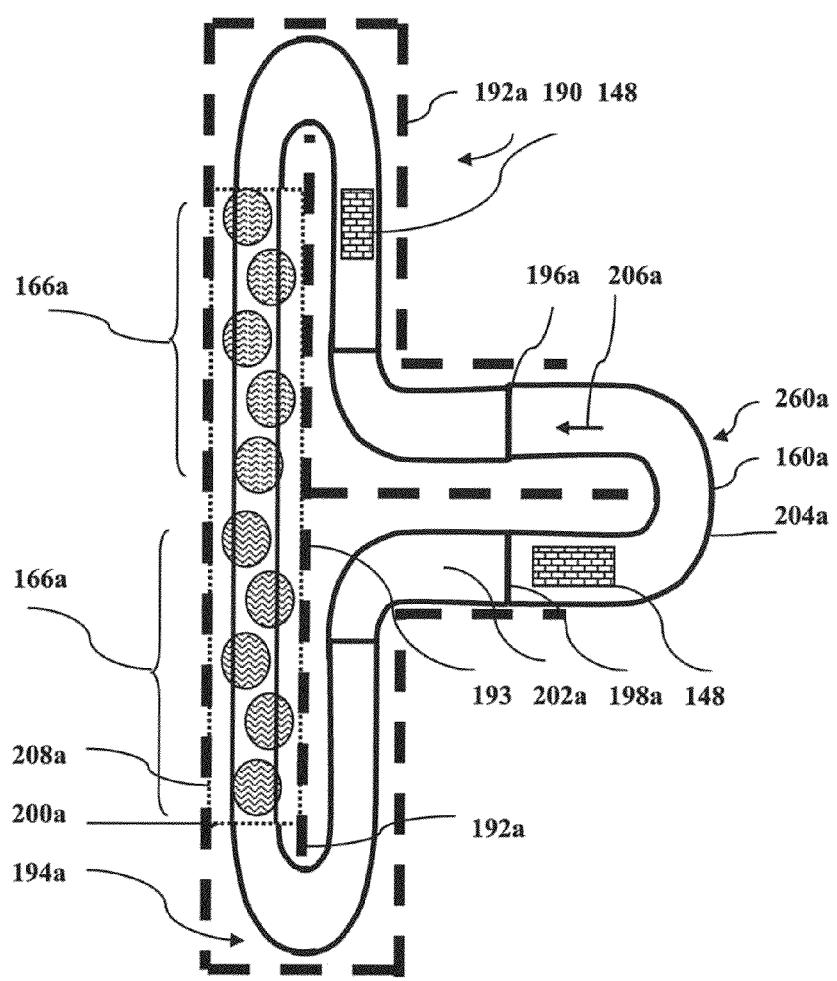

FIGS. 19-20 illustrates a top cross-sectional view of an apparatus 190a having a T-shaped profile for killing pathogenic and non-pathogenic organisms using low-energy x-rays having the external shield 192a defining a rectangular pattern housing the irradiation zone 194a including the conveyor 160a and irradiation chamber 200a having a first internal shield 208a disposed within the irradiation zone 194a, wherein the closed portion 202a of the conveyor assembly 260a is enclosed within and transports foodstuffs 148 along a passageway within the irradiation zone 194a defined between an inlet 196a and an outlet 198a and the conveyor open portion 204a access in open communication with the irradiation zone 194a and defines an open access region exterior to the shielding assembly for accessing articles to be irradiated or that have been irradiated within the irradiation chamber 200a. A second internal shield 193 is integrally formed with external shield 192a to position the closed portion 202a of the conveyor assembly from the open portion 204a. As shown further in FIG. 19, the directional arrow 206a indicates a direction of travel of the conveyor.

FIGS. 19-20 illustrates a top cross-sectional view of the apparatus 190a with a T-shaped profile shown in FIG. 19 further including an exemplary two tube pattern groups 166a of ten tubes disposed within the irradiation chamber 200a as shown and described with respect to FIG. 7. However, the tubes shown in FIG. 20 may be arranged in any pattern as shown and described with respect to FIGS. 7-10; and may be either opposed or non-opposed and off-set as shown and described with respect to FIGS. 11 and 14.

Figure 21:
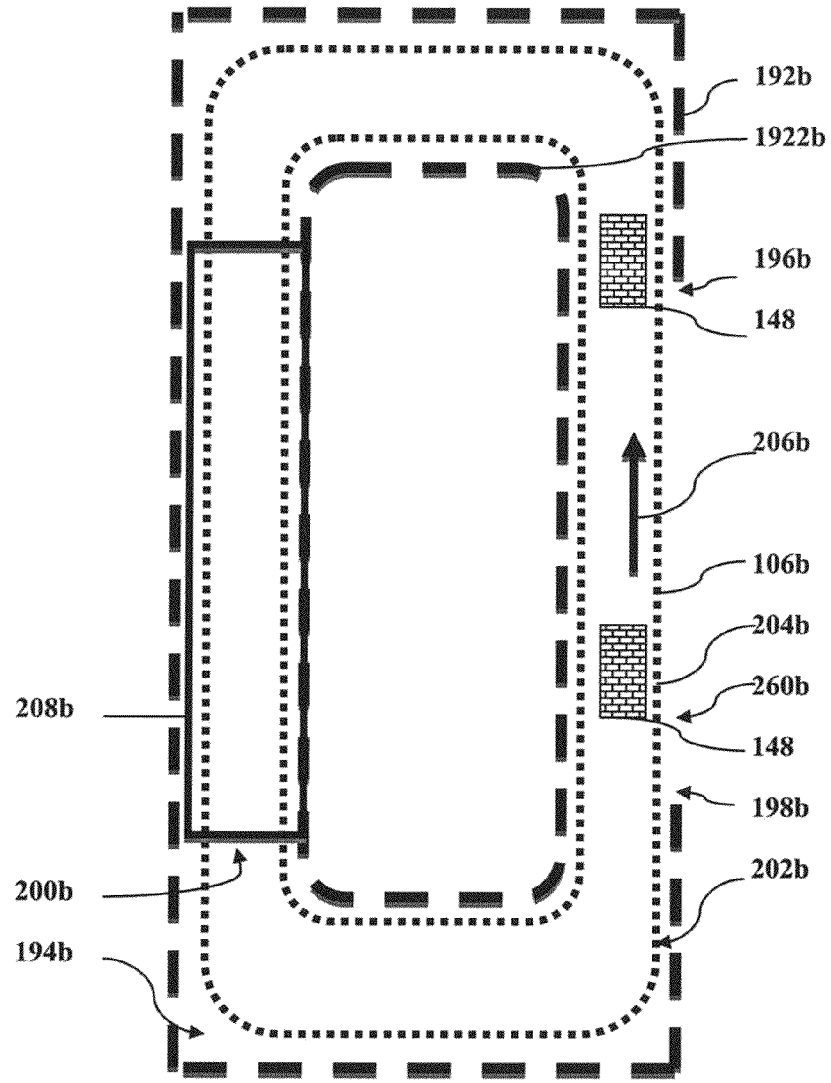
FIGS. 21-22 illustrate a top cross-sectional view of an apparatus having an elongated oval floor plan.

FIG. 21 illustrates a top cross-sectional view of an elongated oval floor plan of an apparatus 190b for killing pathogenic and non-pathogenic organisms using low-energy x-rays having the external shield 192b defining a rectangular pattern housing the irradiation zone 194b including the conveyor 160b and irradiation chamber 200b disposed within the irradiation zone 194b, wherein the closed portion 202b of the conveyor assembly 260b enclosed within and transports foodstuffs 148 along a passageway within the irradiation zone 194b defined between an inlet 196b and an outlet 198b and the conveyor open portion 204b in open communication with the irradiation zone 194b and defines an open access region exterior to the shielding assembly for accessing articles to be irradiated or that have been irradiated within the irradiation chamber 200b including internal shield 208b. As shown further in FIG. 21, the directional arrow 206b indicates a direction of travel of the conveyor. The direction of travel can be reversed in all embodiments.

Figure 22:
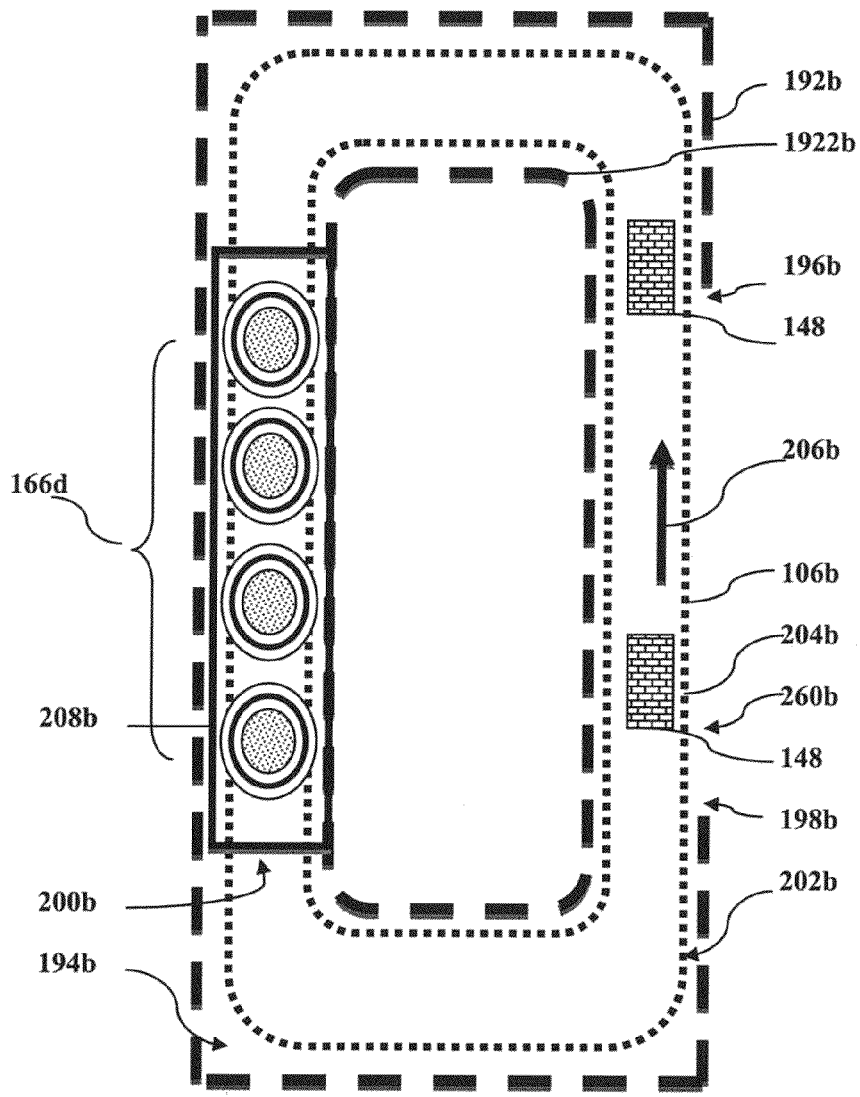

In an embodiment illustrated in FIG. 22 an apparatus similar to the elongated oval profile apparatus shown in FIG. 21 further includes an in-line configuration of x-ray tubes disposed within an irradiation chamber, when the irradiation the x-ray tubes are disposed in alignment around the conveyor central longitudinal axis and further wherein the number of tubes equals four as described with respect to the tube pattern group 166d in FIG. 10.

In an embodiment of the invention shown in FIG. 22, the tubes shown in FIG. 22 may be either upwardly or alternatively, downwardly facing; and may be arranged in any pattern as shown and described with respect to FIGS. 7-10; and may be either opposed or non-opposed and off-set as shown and described with respect to FIGS. 11 and 14.

Figure 23:
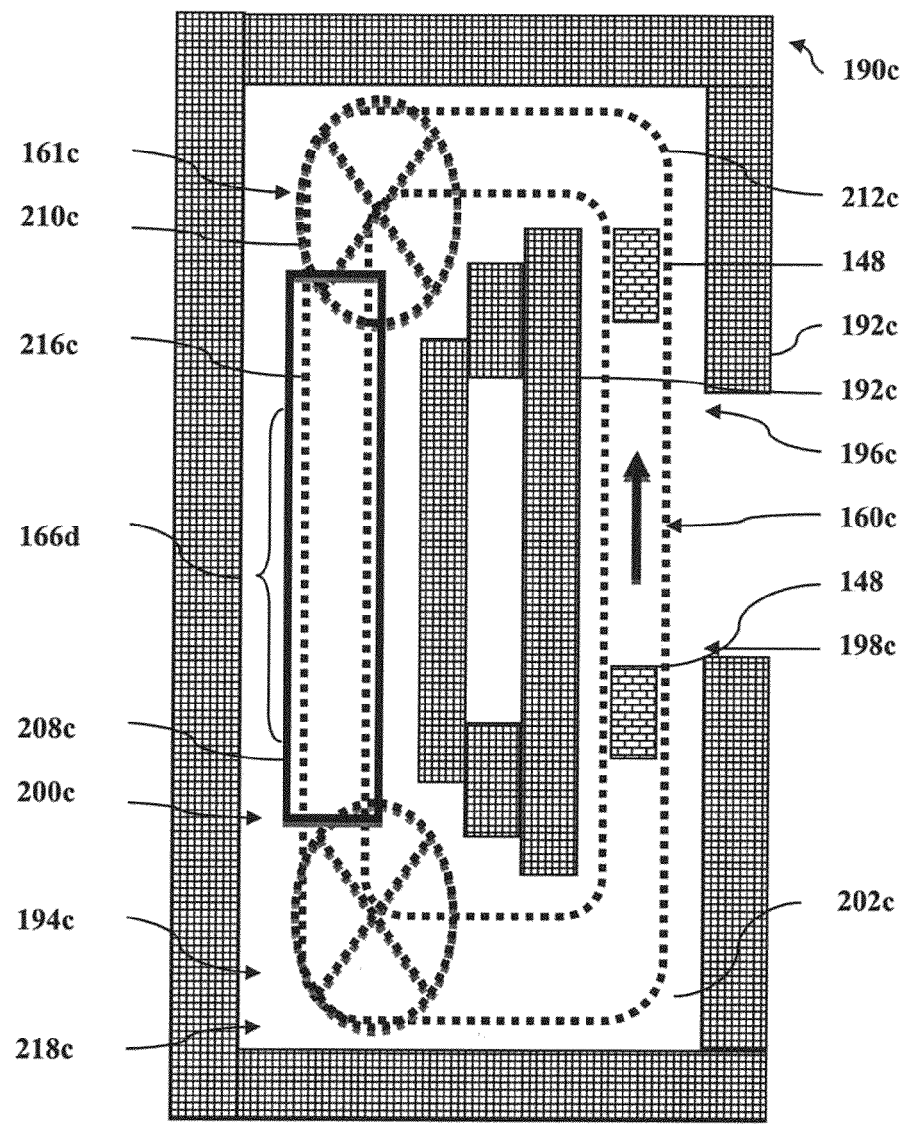
FIGS. 23-24 illustrate a top cross-sectional view of an apparatus having an elongated oval-spiral floor plan.
Figure 24:
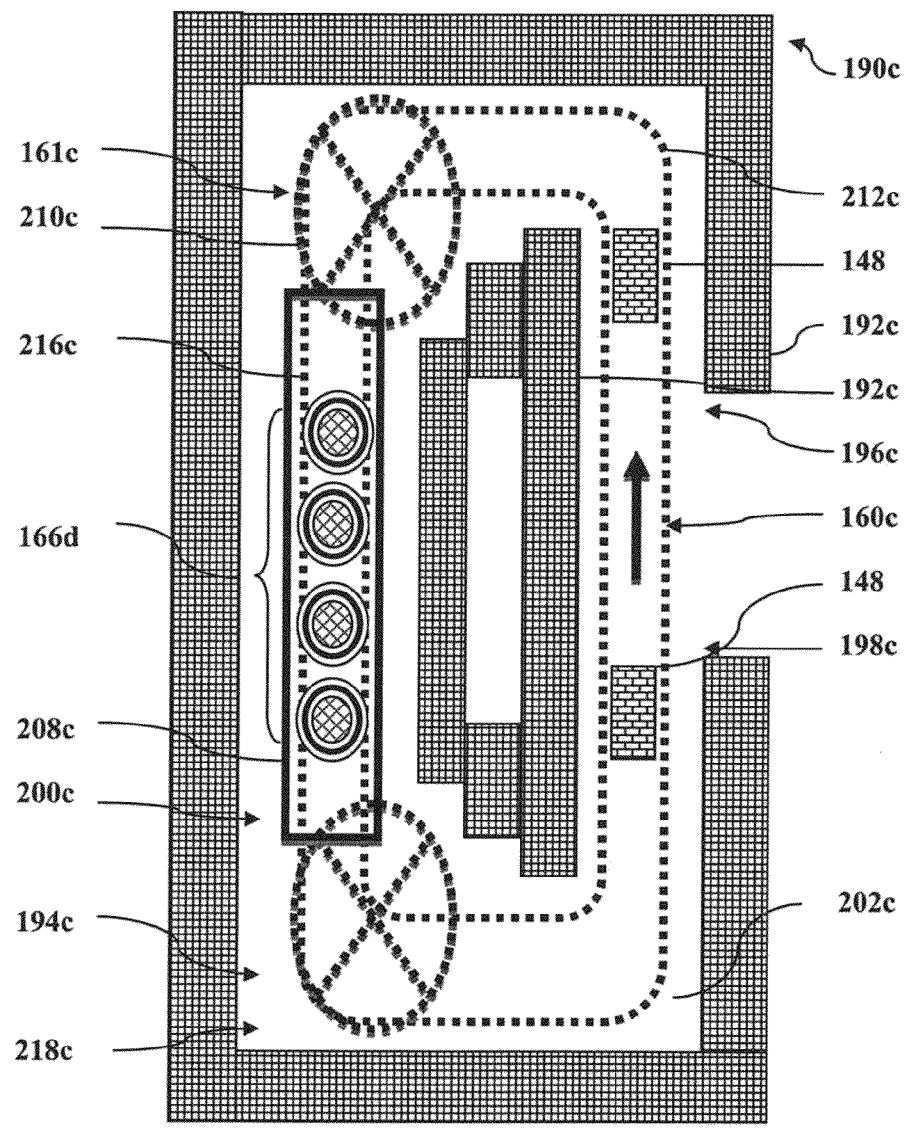

In an embodiment of the invention shown in FIGS. 23-24, a top cross-sectional view of an apparatus 190c including an oval-spiral conveyor system 161c having a two level conveyor 160c including a closed portion 202c housed by external shield 192c within the apparatus 190c for killing pathogenic and non-pathogenic organisms using low-energy x-rays is illustrated.

The portion of the conveyor 160c passing through the irradiation chamber 200c having internal shield 208c is elevated through a first spiral or helically-shaped elevating member 210c adapted to vertically elevate articles 148 disposed on the conveyor 160c within the irradiation zone 194c from a first level 212c (shown in more detail in FIG. 25) transported from the irradiation zone inlet 196c to a second elevated level 216c (shown in more detail in FIG. 25) through the irradiation chamber 200c and out of the irradiation chamber 200c via a second spiral or helically shaped de-elevating member 218c that de-elevates the articles 148 disposed on the conveyor 160c within the irradiation zone 194c to the first conveyor level 212c and out the irradiation zone outlet 198c.

As shown in FIG. 24, a configuration including the apparatus 190c including the oval-spiral conveyor system 161c further includes an exemplary four x-ray tubes arranged in tube pattern group 166d as described with respect to FIG. 10, however any combination of x-ray tubes as described with respect to FIG. 7-18 may be disposed within the irradiation chamber.

Figure 25:
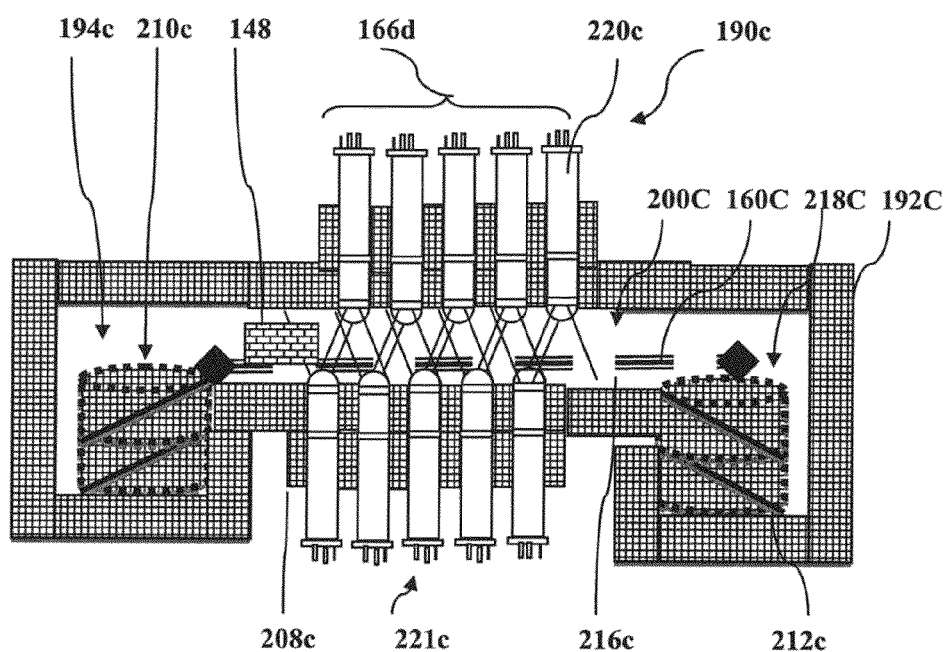
FIG. 25 illustrates a cross-sectional side elevation view of the apparatus shown in FIG. 24.

FIG. 25 illustrates a cross-sectional side elevational view of the apparatus 190c shown in FIG. 24 including all of the elements described with respect to FIGS. 23-24 including first and second levels 212c, 216c, respectively of the conveyor 160c and the first and second spiral elevating and de-elevating members 210c, 218c disposed within the irradiation zone 194c and further illustrates the elevated irradiation chamber 200c including an exemplary five upper tubes and five opposing lower tubes 220c.

As discussed with reference to FIG. 24, the number of tubes 220c, 221c (shown in FIG. 25) may comprise any of the configurations as described with respect to FIGS. 7-18 herein.

Figure 26:
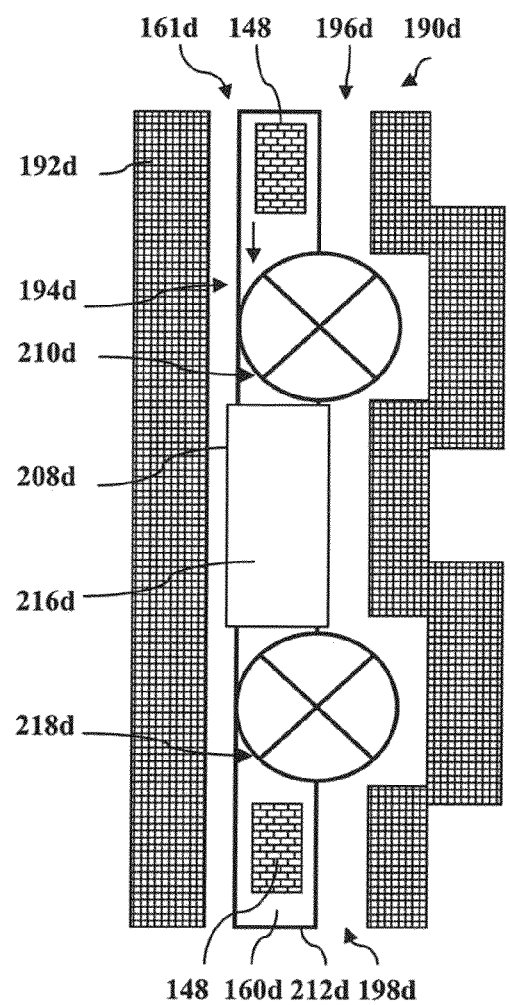
FIG. 26 illustrates a top cross-sectional view of an apparatus having an in-line spiral floor plan.

In an embodiment of the invention shown in FIG. 26 a top cross-sectional view of an apparatus 190d including an oval-spiral conveyor system 161d having a two level conveyor 160d housed by external shield 192d within the apparatus 190d for killing pathogenic and non-pathogenic organisms using low-energy x-rays is illustrated.

The portion of the conveyor 160d passing through the irradiation chamber 193d is elevated through a first spiral or helically-shaped elevating member 210d shielded by a second internal shield 193d adapted to vertically elevate articles disposed on the conveyor 160d within the irradiation zone 194d from a first level 214d (shown in more detail in FIG. 25) transported from the irradiation zone inlet 196d to a second elevated level 216d (shown in more detail in FIG. 25) through the irradiation chamber 200d and out of the irradiation chamber 200d via a second spiral or helically shaped de-elevating member 218d shielded by another internal shield 220d that de-elevates the articles 148 disposed on the conveyor 160d within the irradiation zone 194d to the first conveyor level 212d and out the irradiation zone outlet 198d.

As shown in FIG. 24, a configuration including the apparatus 190d including the oval-spiral conveyor 161d further includes an exemplary five x-ray tubes arranged in the irradiation chamber shown in a configuration similar to the tube pattern group described with respect to FIG. 7, however any member and combination of ray tubes as described with respect to FIG. 7-18 may be disposed within the irradiation chamber.

Figure 27:
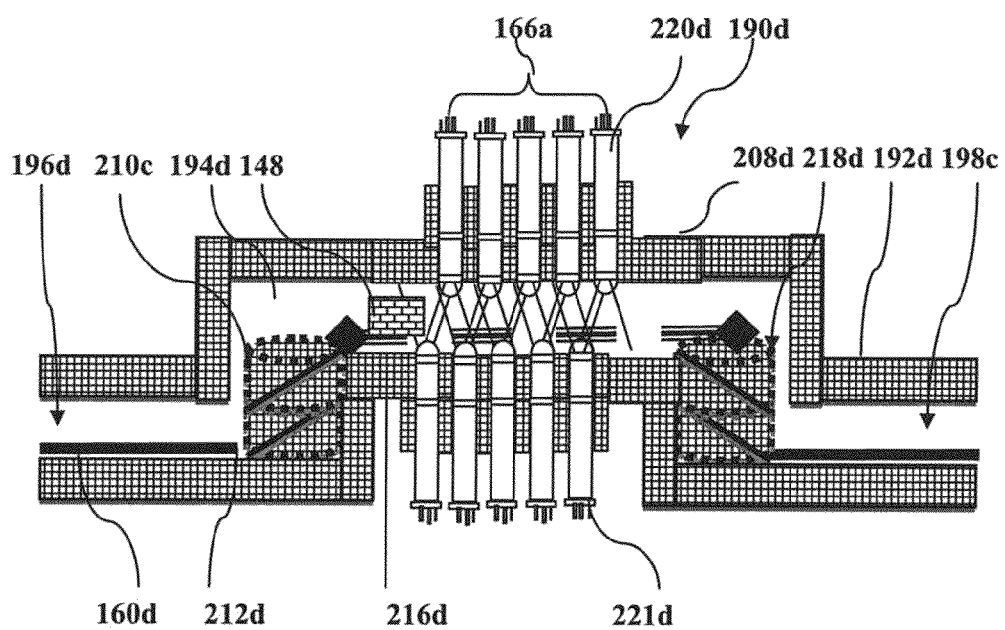
FIG. 27 illustrates a cross-sectional side elevation view of the apparatus shown in FIG. 26.

FIG. 27 illustrates a cross-sectional side elevational view of the apparatus 190d shown in FIG. 23 including, first and second levels 214d, 216d, respectively of the conveyor 160d and the first and second spiral elevating and de-elevating members 210d, 218d disposed within the irradiation zone 218d and further illustrates the elevated irradiation chamber 156d including an exemplary five upper tubes and five opposing lower tubes 220d.

As discussed with reference to FIG. 24, the number of tubes 220d may comprise any of the configurations as described with respect to FIGS. 7-18 herein.

As discussed with reference to FIG. 26, any number and combinations of tubes 220d may comprise as described with respect to FIGS. 7-18 may be disposed within the irradiation chamber herein.

Figure 28:
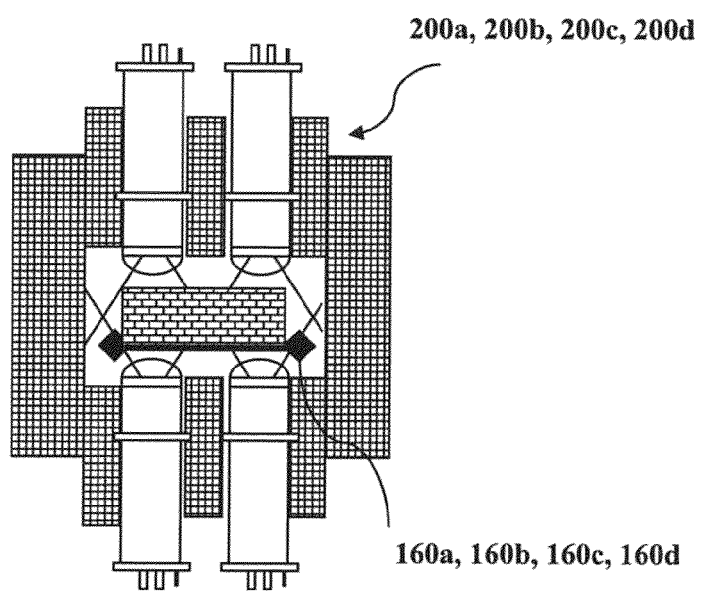
FIG. 28 illustrate a cross-sectional side elevation view of the apparatus shown in FIGS. 19-26 having a cross-section perpendicular to the direction of conveyor travel within the apparatus.

FIG. 28 illustrates cross-sectional view of an irradiation chamber 200a, 200b, 200c, 200d respectively associated with any of the apparatuses 190a (shown in FIGS. 19-20), 190b (shown in FIGS. 21-22), 190c (shown in FIGS. 23-25), and 190d (shown in FIGS. 26-27), respectively taken across an axis transverse to the path of travel of the conveyor 160a, 160b, 160c, 160d, respectively.

It will be understood, with reference to each of the foregoing examples, that the rate of movement through the conveyor and past the x-ray field(s) of the foodstuff being irradiated will be dictated by the necessity of ensuring proper dosing, which in turn is a function of the intensity of the x-ray field and the duration of exposure.

It will also be appreciated from the above disclosure that the present invention providing an apparatus and method for the irradiation of foodstuffs that is at once efficacious and easily employed, which does not adversely affect product taste, which permits the use of x-rays with minimal shielding, and which further does not suffer from the public concern over the use of radioactive isotopes such as Co60.

Without desiring to be bound by any particular theory, the inventors hereof believe that this utility is attributable to the greater absorption of low-energy x-rays having, according to the present invention, a continuous spectrum of energies which includes energies of from approximately 10 KeV and upwards. These lower energy photons are more readily absorbed by the articles being irradiated, as contrasted with the high energy photons generated by conventional food irradiation methodologies, such as Co60, which photons completely penetrate the foodstuff being irradiated.

As indicated, the inventive method for killing pathogenic and nonpathogenic organisms in an article essentially comprises exposing the article to bremsstrahlung-type low-energy x-rays characterized by a continuous spectrum of energies in the range of from approximately 10 KeV to approximately 440 KeV, and preferably in the range of from approximately 10 KeV to approximately 220 KeV, and even more preferably in the range of from approximately 10 KeV to approximately 200 KeV, for a period of time sufficient to provide at least a predetermined dose of radiation to the article. It will be appreciated by those of skill in the art that a "predetermined dose" may be dictated by, for instance, government regulations comprehending the nature of the article being irradiated, In the United States, for example, the FDA specifies that irradiation methods for killing pathogens in food products must be capable of realizing a 5 log reduction in the pathogen population without exceeding specified maximum doses of radiation according to the type of the foodstuff irradiated. For instance, poultry meats treated by irradiation cannot exceed doses of from 1.5 kGy to 3.0 kGy, while fresh (i.e., not frozen) red meats cannot exceed doses of 4.5 kGy.

It will be appreciated from the foregoing that the method of this invention may be employed not only to significantly reduce pathogenic organisms from foodstuffs and other articles, and further to do so without adversely affecting the taste of such foodstuffs, but further to eliminate non-pathogenic organisms, including those which may be implicated in the spoilage of foodstuffs. Thus, for example, it is contemplated that low-energy x-rays may be employed to treat whole or otherwise unprocessed foodstuffs to eliminate or reduce the presence of organisms, including non-pathogenic microbes, insects, etc., which may cause spoilage or otherwise reduce the shelf-life thereof. It will likewise be appreciated from this disclosure that while the irradiation of beef and fish is exemplified, the methodology of this invention may be transposed to the treatment of numerous other foodstuffs with no more than routine experimentation by varying the maximum energy of the low-energy x-rays employed, as well as the duration and intensity of the exposure, in order to determine the energy, time and intensity necessary to provide a desired dose of radiation to the foodstuff, whether the desired result is the elimination of pathogenic or other organisms, or the same coupled with the preservation of the initial, pre-irradiated taste of the foodstuff.

In connection with the aforementioned considerations, the inventors hereof have further discovered that mixing of foodstuff may be employed before and during irradiation in order to decrease the duration of exposure to the low-energy x-rays and increase the uniformity of the dose absorbed, while ensuring that the entire foodstuff being irradiated receives the desired dose. Necessarily, the degree of mixing will vary according to such considerations as the dimensions of the apparatus employed to accommodate the foodstuff during irradiation, as well as the nature of the foodstuff being irradiated.

EXAMPLE 1

Experimental

Using a Varian MCS 7000 Series x-ray tube with a Varian Model HE1256 heat exchanger (output measured at 214,400 rad/minute), pathogen-containing samples of deionized water were subjected to various doses of x-rays having energies exclusively in the range of below approximately 60 KeV in order to determine the efficacy of the inventive method in eliminating pathogens. The test pathogen comprised $E.\ coli$ ATTC No. 35421, a Coliform bacteria selected for its relatively high vigor and surrogate properties. The initial sample population of bacteria was established by transferring a loop of stock solution to several plates of Endo agar medium, adapted from Clesceri et al., Standard Methods for the Examination of Water and Wastewater (20th ed.), at 9222B. Unless otherwise specified, the foregoing and other protocols discussed in relation to this example were adapted from Clesceri et al., Standard Methods for the Examination of Water and Wastewater (20th ed.), published by the American Public Health Association, the American Waterworks Association, and the Water Environment Federation.

The thus-transferred bacteria were incubated at 35-37° C. for 24 hours, whereupon the plates were inspected to ensure that the colony-forming units ("CFU's") comprised Coliform bacteria. Several typical Coliform colonies were subsequently transferred to six (6) separate tubes of EC-MUG media, as specified in Standard Methods for the Examination of Water and Wastewater, supra, at 9221 F, and the fluorescence characteristics of the samples evaluated to confirm the presence of $E.\ coli$.

Aliquots of the foregoing characteristic CFU's were next transferred to a bottle of Lactose broth and incubated for 48 hours at 35-37° C. The resulting solution was designated as the "Stock Standard."

In final confirmation of the presence of Coliform as $E.\ coli$, a loop of the Stock Standard solution was transferred to a dish of Endo agar, as well as being deposited in the EC-MUG medium, and the characteristics of $E.\ coli$ colonies established therefrom.

From the foregoing Stock Standard, multiple 125 ml test samples of the $E.\ coli$ pathogens suspended in deionized water were prepared, with each sample comprising about 1 million organisms per ml. These samples were maintained at 4° C. pending irradiation using low-energy x-rays with energies in the range of below approximately 60 KeV for the durations set forth in Table I, below. The maximum dose received by each sample was estimated to be well below 1.5 kGy.

TABLE I

| Sample Identification | Irradiation Time |
|---|---|
| Bk-31 | 0 hrs |
| Bk-32 | 0.5 hrs |
| Bk-33 | 1 hrs |

TABLE I-continued

| Sample Identification | Irradiation Time |
|---|---|
| Bk-34 | 1.5 hrs |
| Bk-35 | 2 hrs |
| Bk-53 | 0 hrs |
| Bk-54 | 4 hrs |
| Bk-55 | 7 hrs |
| Bk-56 | 10 hrs |
| Bk-57 | 0 hrs |

As reflected by the absence of irradiation ("Irradiation Time"=0) the specimens designated Bk-31, Bk-53 and Bk-57 constituted the controls for these experiments.

Referring now to each Table II and of FIG. 29, reproduced below, the results for the samples irradiated in accordance with Table I are presented. With respect to Table II in particular, the data represent the average number of organisms calculated to be present in plated extracts of $E.\ coli$ either diluted (using 99 ml phosphate buffer) from the corresponding sample by the indicated dilution factor (provided in the "Dilution/Filtration" column of Table II) using the pour plate method of Standard Methods for the Examination of Water and Wastewater, supra, at 9215 B, or filtered from the indicated quantity (in ml, also provided in the "Dilution/Filtration" column of Table II) of the original sample using the membrane filter method of Standard Methods for the Examination of Water and Wastewater, supra, at 9215 D. More particularly, each count represents the average population per ml of three quantifications conducted for each sample at the indicated dilutions and filtrations. The parenthetical numbers reflect the average population per ml normalized to the control sample Bk-31, the samples Bk-53 through Bk-57 having been prepared, irradiated, and evaluated subsequently. The indicated dilution factors of Table II were determined based upon the expected efficacy of irradiation for each sample, in view of the need to realize no more than 300 colonies per plate necessary to ensure accurate quantification of the plated organisms. As will be appreciated, the number of organisms present in the total 125 ml volume of each irradiated sample can be determined by multiplying the plated count by the corresponding dilution factor.

TABLE II

| Sample Identification | Method of Analysis | Average Population Per ml | Dilution/Filtration |
|---|---|---|---|
| Bk-31 | Total Plate Count | 1,230,389 | 1:100,000 and 1:10,000 |
| Bk-32 | Total Plate Count | 694,833.3 | 1:10,000 and 1:1,000 |
| Bk-33 | Total Plate Count | 353,833.3 | 1:10,000 and 1:1,000 |
| Bk-34 | Total Plate Count | 168,933.3 | 1:1,00 and 1:100 |
| Bk-35 | Total Plate Count | 37,278 | 1:10 and 1:1 |
| Bk-53 | Total Plate Count | 1,041,667 | 1:100,000 and 1:10,000 |
| Bk-54 | Total Plate Count | 5 (6.041188) | 1:100 and 1:10 |
| Bk-55 | Total Plate Count | 0.588889 (0.204617) | 1:1/5 ml and 10 ml |
| Bk-56 | Total Plate Count | 0.244444 (0.008948) | 1:1/10 ml and 30 ml |
| Bk-57 | Total Plate Count | 995,000 | 1:100,000 and 1:10,000 |

Figure 29:
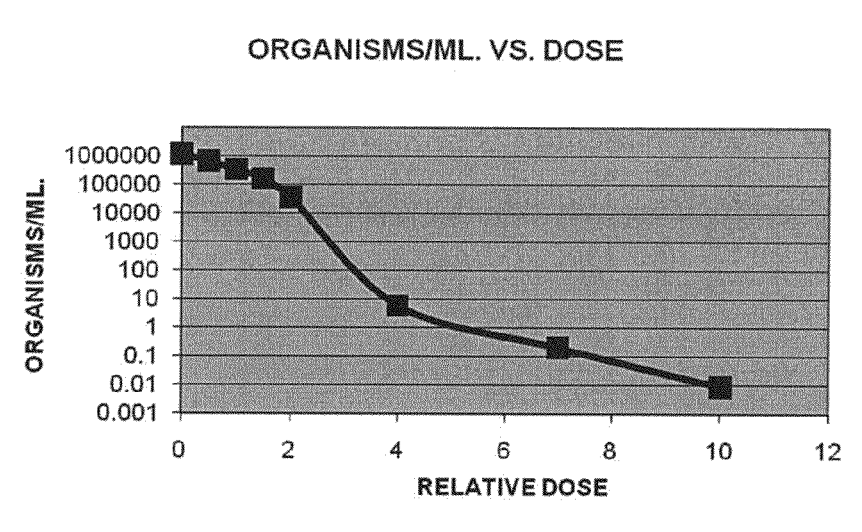
FIG. 29 graphically depicts the decrease in pathogenic organisms as the absorbed dose increases.

Referring particularly to FIG. 29, the same plots the calculated average population per ml for each of the samples Bk-31 through Bk-25, Bk-54, Bk-55, and Bk-56 from Table II, above, against the relative dose of x-ray irradiation received by each sample. As clearly evidenced, the inventive method of employing low-energy x-rays is more than sufficient to achieve a significant reduction in the initial pathogen population. And, more specifically in relation to the example shown, the over 7-log reduction achieved in the original sample populations exceeds the FDA's requirement that a foodstuff-treatment method achieve no less than a 5-log reduction in the pathogen population of the treated foodstuff. 1 E Ex #2.

EXAMPLE 2

Experimental

To evaluate the reduction of pathogens in ground beef, 80 oz frozen ground beef was thawed, homogenized by hand, and split into two parts of approximately 40 oz each. A first part went uninoculated, while a second part was inoculated with a five-serovar cocktail of *E. coli* O157:H7. The stock cultures of each serovar were maintained separately at 80° C. in TSB-YE medium containing 20% glycerol. Before use, each serovar was cultured separately in TSB-YE using a minimum of 2 consecutive 24 h transfers to obtain cells in late log phase. Immediately prior to inoculation of the ground beef sample, equal volumes of each culture were combined, centrifuged (6,000×g, 20 min at 4° C.) and resuspended in sterile peptone water. The inoculum was added dropwise into the homogenized ground beef (approximately 1140 g) and hand-mixed for approximately 10 minutes under aseptic conditions to achieve a final concentration of approximately $10^8$ CFU/g of ground beef.

Using sausage casing and a stuffer, the inoculated and uninoculated ground beef samples were each separately formed into cylindrically-shaped logs of about 2¼ inches in diameter. The logs were frozen at −80° C. and slices cut therefrom using a commercial meat slicer (⅛ inch thick slices for the inoculated sample and 1/16 inch thick slices for the uninoculated sample). Immediately after slicing, each inoculated slice was transferred to a sterile, 8 oz plastic bag and stored at −4° C. Pairs of 1/16 inch uninoculated slices were formed into ⅛ inch "sandwiches" having a radiochromic film dosimeter (GAF3001DS, GEX CORPORATION, CO) between slices to measure the dose inside each sample for each test condition. These "sandwiches" were each likewise transferred to a sterile, 8 oz plastic bag and stored at −4° C.

Both the inoculated and uninoculated ground beef slices were irradiated with x-rays having a continuous spectrum of energies of from approximately 10 KeV up to approximately 70 KeV. The distance from the x-ray source to each irradiated slice was approximately 1¼ in. In order to investigate the dose lethality relationship, sample slices were irradiated using various combinations of time and current to target 0.5, 1.0, 2.0, 2.5, 3.0, 4.0, 4.5, 5.0 and 6.0 log reductions in the *E. coli* population in the samples.

Following irradiation, *E. coli* population reductions were measured experimentally. More specifically, the inoculated, irradiated samples were homogenized with 0.1% peptone water in a stomacher for 80 seconds. Appropriate dilutions were plated in duplicate onto *E. coli* or aerobic plate count PETRIFILMS, depending upon the inoculum. These plates were then incubated at 35±° C. for 48 h.

The actual dose received by each irradiated sample was measured using a routine dosimetry system. More specifically, the radiochromic film dosimeters (RFD) were employed in their original package (OP), wrapped with plastic film (PF), and in a bare application (BA). The measurements were performed by GEX CORPORATION (CO). Measurements using PF and BA were nearly identical, while measurements using OP were less (~100 Gy).

Figure 30:
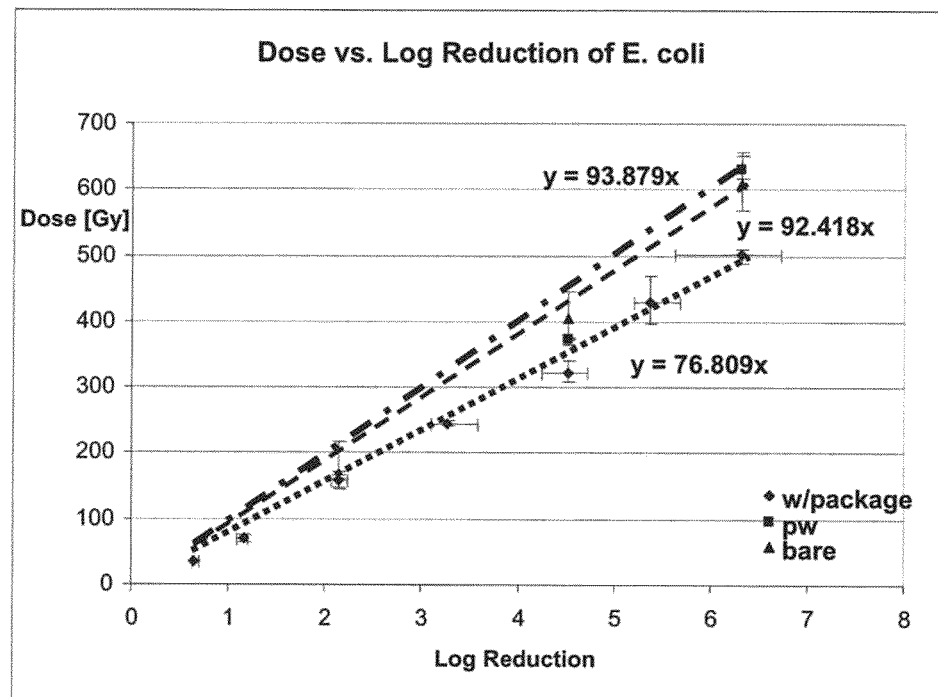
FIG. 30 graphically depicts the increase in log reduction in pathogenic organisms as the absorbed dose increases for 4 oz. ground beef patties FIG. 31 graphically depicts the increase in log reduction in pathogenic organisms as the absorbed dose increases for 8 oz. ground beef patties.

Referring to FIG. 30, there is shown a dose-effect map plotting experimental log reductions against the actual dose measurements for the irradiated samples. As shown, the D10 values (i.e., the dose required to achieve a 1 log reduction) for each measurement method (OP, PF, and BA) were 76.8, 92.4 and 93.9 Gy, respectively.

Figure 31:
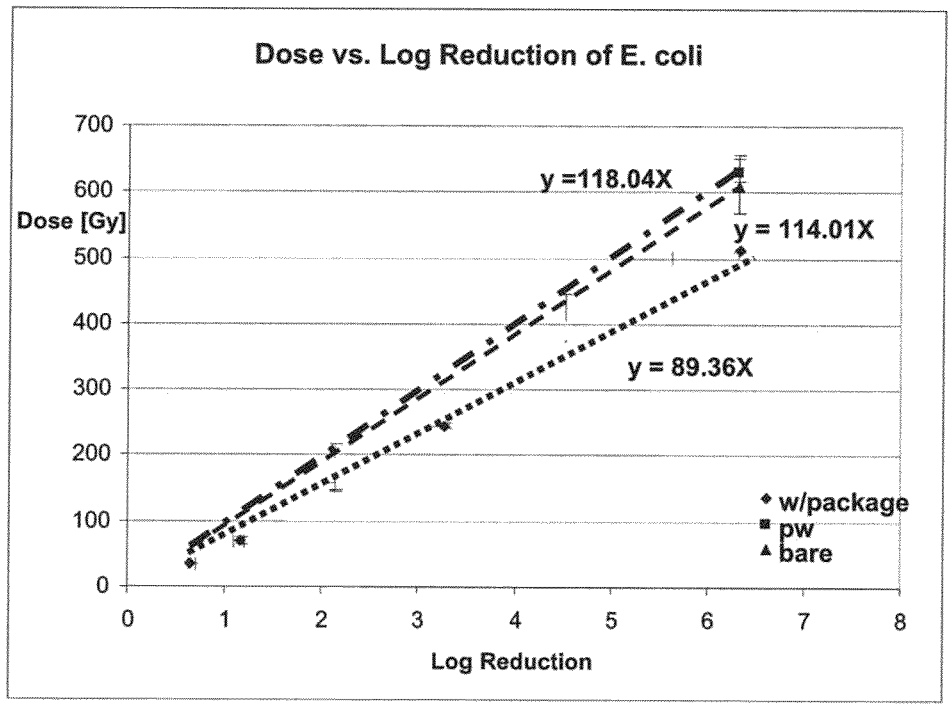

In addition to *E. coli*, the effect of irradiation on general spoilage microorganisms was measured in terms of total plate count (TPC). As dose measurement could not be obtained for PF and BA samples, however, a single point measurement was used to perform linear regression (intercept=0). The D10 values for this case were 89.4 (OP), 114.0 (PF) and 118.0 (BA), all as shown in FIG. 31.

Figure 32:
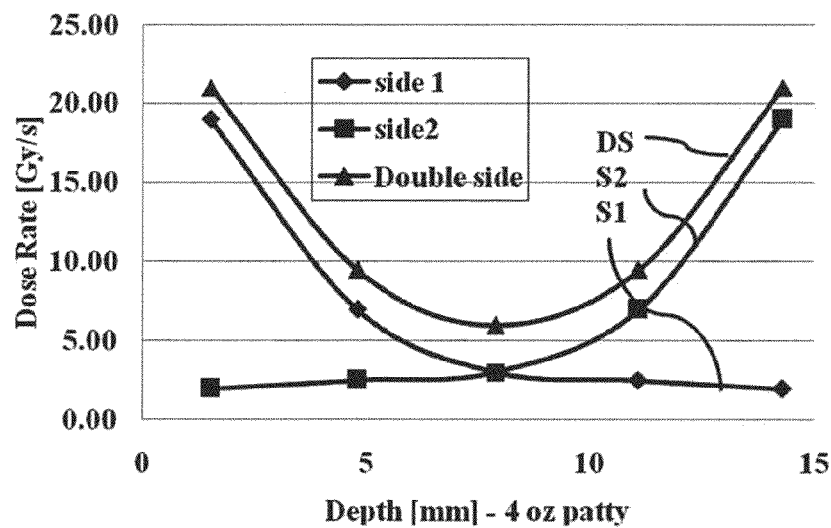
FIG. 32 graphically depicts how the dose profile from the top tube, S1 and the bottom tube, S2 sum to provide the total dose profile, DS 4 oz. beef patty stack.
Figure 33:
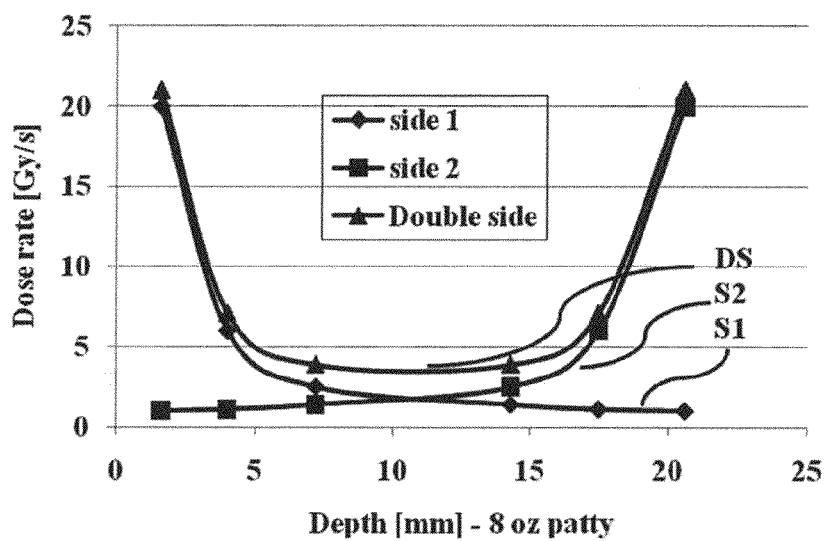
FIG. 33 graphically depicts how the dose profile from the top tube, S1 and the bottom tube, S2 sum to provide the total dose profile, DS in the 8 oz. beef patty stack.

To evaluate the penetration depth achievable with x-rays in the range of the present invention, ⅛ inch slices were cut from the uninoculated log and stacked 5 and 8 slices high to form ⅝ inch and 1 inch thick "patties," respectively. For the ⅝-inch "patties," six dosimeters were placed between each of the five slices, as well as on the top and bottom of the stack. For the 1" "patties," six dosimeters were positioned at 0'", ⅛", ⅜", ⅝", ⅝" and 1". One side of each of the stacked samples were each exposed for a designated period of time to x-rays having energies in the spectrum of from approximately 10 KeV up to approximately 70 KeV. Distance from the stacked samples to the x-ray source was 1.25". These results (S1, S2 in FIGS. 32 and 33) were flipped and then superpositioned to generate double-side (DS in FIGS. 32 and 33) dose rates (Gy/s) for each of the ⅝" and 1" "patties." As shown in FIGS. 32 (dose rates for the 4 oz (⅝") patties) and 33 dose rates for the 8 oz (1") patties), the maximum dose achieved was proximate the top and bottom of the stacks, while the lowest dose was in the middle of each "patty."

In addition to the foregoing, stacks of inoculated ⅛ in slices stacked into ⅝" and 1" "patties" were irradiated with x-rays having energies in the spectrum of from approximately 10 KeV up to approximately 70 KeV for the periods of time specified in Table III, below. The overall log reductions of *E. coli* O157:H7 were measured as described previously, and the dose at the middle of each "patty" predicted based on the dose deposition rate determined from the dose penetration study described above. Based on preliminary evaluation, the visual quality of the "patties" was unaffected by the irradiation.

TABLE III

| "Patty" Thickness | Irradiation Time (s) | Predicted Dose (Gy) | Log (N/No) |
|---|---|---|---|
| ⅝" | 30 s | 153 | 1.20 |
| ⅝" | 120 s | 612 | 5.76 |
| 1" | 60 s | 179 | 1.45 |
| 1" | 240 s | 715 | 6.40 |

The foregoing examples demonstrate the efficacy of the invention in killing pathogenic and non-pathogenic organisms in articles, and particularly foodstuffs, using x-ray radiation. The latter example further demonstrates the utility of x-rays in killing pathogens to the degree required by FDA requirements while dosing the foodstuff at a level significantly below the maximum dose (in kGy) specified by the FDA for red meat.

EXAMPLE 3

Experimental

The objective of the present experiment was to assess microbial efficacy of low-energy X-ray for reduction of indigenous spoilage microorganisms in salmon and croaker fish fillet and to conduct informal quality assessment.

Figure 34:
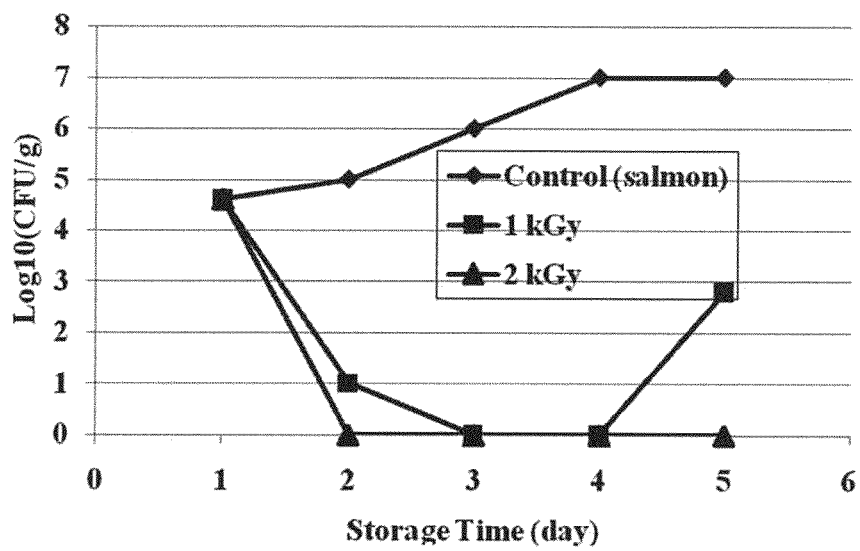
FIG. 34 graphically depicts the spoilage organism growth rate for the control and the decrease in organism population for the treated Salmon samples as a function of days.
Figure 35:
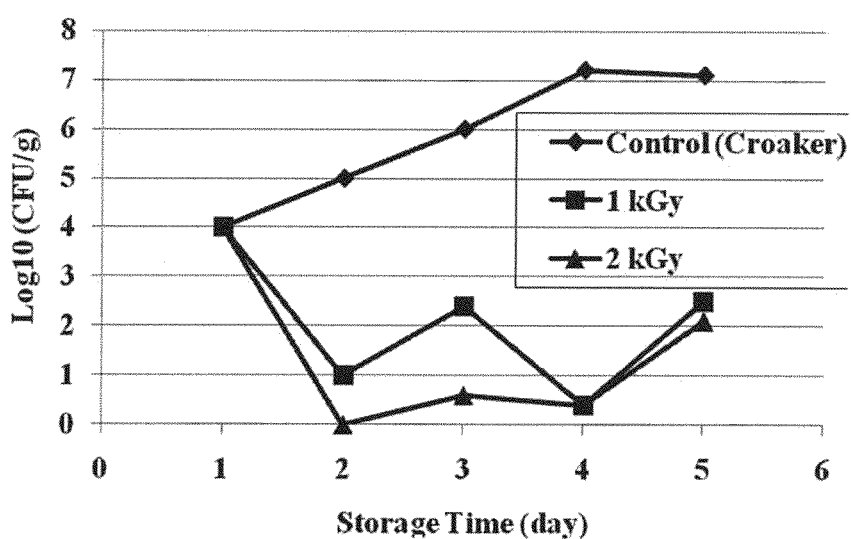
FIG. 35 graphically depicts the spoilage organism growth rate for the control and the decrease in organism population for the treated Croaker samples as a function of days.

FIGS. 34 and 35 illustrate the post-irradiation growth patterns of respective salmon and croaker fish samples. In particular, FIG. 1 illustrates post-irradiation grown pattern of control (0 kGy), low-dose (1 kGy), and high-dose (2 kGy) salmon samples, wherein two data points for 24 h and 6 d in the control sample were conjectured based on the measurements of 12 d and 18 d. FIG. 2 illustrates post-irradiation growth pattern of control (0 kGy), and high-dose (2 kGy) croaker fish samples wherein two data points of 24 h and 6 d in the control sample were conjectured based on the measurements of 2 d and 18 d. The salmon materials used included a thin slice (~5 mm) of salmon and croaker fish samples (<5 g each) were packaged in MAP. The samples were refrigerated at 4 degrees Celsius during the test period. The samples were then irradiated at low dose (~1 kGy) and high dose (~2 kGy) of X-ray. The irradiation samples were stored in a refrigerator with control samples and then sampled at 1, 6, 12, and 18 days of storage. For each sampling, anaerobic plating and color measurement were conducted. The results of this showed low and high dose irradiation were able to reduce spoilage microorganism population to a significantly lower level for salmon and croaker fish (see FIG. 34 and FIG. 35). Also, the post radiation growth of the irradiated samples was not promoted during the storage periods of 1, 6 and 12 days, but at 18 days there was some increment of microorganism population, however, it was not significant and the population of the control sample kept increasing throughout the storage period. The results showed red color component of the high-dosed salmon sample was different from the sample with low-dosed samples ($p=0.046$ with 95% confidence) and control samples ($p=0.014$ with 95% confidence). However, there was no significant difference between low-dosed and control samples ($p=0.512$ with 95% confidence). Further, rotten fish odor was developed in the control samples (6~18 days) but not in the irradiated samples, of course, this was a subjective test. It was also observed that the samples were severely dehydrated due to the small sample size. In conclusion, low dose (~1 kGy) of x-ray for salmon and high dose (~2 kGy) for croaker fish fillet are expected to be able to extend shelf life without significant quality changes. However, a testing with actual product is necessary to confirm this conclusion because the pilot test was conducted with small samples.

Of course, the foregoing is merely illustrative of the present invention, and those of ordinary skill in the art will appreciate that many additions and modifications to the present invention, as set out in this disclosure, are possible without departing from the spirit and broader aspects of this invention as defined in the appended claims.

The invention claimed is:

1. An apparatus for killing pathogenic and non-pathogenic organisms using low-energy x-rays, the apparatus comprising: a shielding assembly that maximizes internal deflections to prevent the x-rays from escaping the apparatus enclosing an irradiation zone having inlet portion and an outlet portion and defining a passageway therebetween, the passageway defining a path of travel for articles to be irradiated between the inlet and outlet portions; means for substantially continuously moving the articles to be irradiated through the irradiation zone at at least a first velocity; and an irradiation chamber that houses at least one x-ray source disposed within the passageway between the inlet and outlet portions in the path of travel of the articles to be irradiated, each at least one x-ray source having a first power level capable of emitting x-rays for a period of time sufficient to provide at least a predetermined dose of radiation to an article and capable of a maximum continuous power output at 100% duty cycle that is selected from within range of from approximately 16 kW to approximately 20 kW to thereby continuously emit low-energy x-rays having energies of from approximately 10 KeV and up to a maximum of approximately 440 KeV,
wherein the at least one x-ray source comprises: an x-ray tube having a longitudinal axis with a power of 16 kW that emits a continuous spectrum of low energy x-rays; wherein the low-energy x-rays emitted by the at least one x-ray tube to which the at least one article is exposed are primarily bremsstrahlung-type x-rays characterized by a continuous range of energies from that of the most energetic electron downwards having energies of 220 KeV; a cathode having a tungsten filament; a non-rotating anode including a target selected from the group consisting of tungsten, copper, aluminum, gold, platinum, strontium, titanium, and rubidium; and a beam window parallel to the target disposed a predefined distance from the target and perpendicularly disposed with respect to the longitudinal axis of the x-ray tube.

2. The apparatus of claim 1, wherein the means for substantially continuously moving the articles to be irradiated through the irradiation zone at least a first velocity comprises: a conveyor system adapted for the movement therethrough of a plurality of articles to be irradiated at a first velocity; at least one conveyor that moves a plurality of articles at least a first velocity through the passageway defined between the inlet and outlet portions of the irradiation zone; at least one open portion accessing an article transported along the at least one conveyor; and a closed portion, housed within the irradiation zone.

3. The apparatus of claim 2, wherein the at least one conveyor forms a closed-loop when moving between the inlet and outlet portions of the irradiation zone and wherein the closed-loop has a profile selected from the group consisting of a T-shaped profile, an oval-shaped profile, and an oval-spiral profile.

4. The apparatus of claim 2, wherein the conveyor forms a two level linear path between the inlet and outlet portions of the irradiation zone.

5. The apparatus of claim 1, wherein the x-ray source further comprises: a plurality of x-ray tubes each capable of exposing an article to a continuous spectrum of energies from approximately 10 KeV up to a maximum of up to 440.

6. The apparatus of claim 5, wherein the plurality of tubes comprise: a first and a second set of tubes, wherein the second set of tubes opposes the first set of tubes across a conveyor having a central longitudinal axis arranged within the irradiation chamber.

7. The apparatus of claim 6, wherein the selected plurality of opposing tubes further comprise: an in-line configuration along the conveyor central longitudinal axis.

8. The apparatus of claim 6, wherein the plurality of selected opposing tubes comprise: an off-center configuration wherein each of the first and second sets of opposing tubes are spaced a predetermined distance laterally off-center from the central longitudinal axis of the conveyor.

9. The apparatus of claim 5, wherein the plurality of tubes further comprise: a first and a second set of tubes, wherein the first set of tubes is disposed above a conveyor having a central longitudinal axis and are adapted to emit x-rays downwardly towards an upper surface of an article being irradiated and towards an upper side of the conveyor, and wherein a second set of tubes are offset longitudinally along the conveyor central longitudinal axis from the first set of tubes and are adapted to emit x-rays towards a lower surface of an article being irradiated and towards a lower side of the conveyor.

10. The apparatus of claim 9, wherein the plurality of tubes further comprise: an in-line configuration along the longitudinal axis of the conveyor.

11. The apparatus of claim 9, wherein the plurality of tubes further comprise: an off-center configuration wherein each of the first and second sets of off-set tubes are spaced a predetermined distance laterally off-center from the central longitudinal axis of the conveyor.

12. The apparatus of claim 1, wherein the shielding assembly further comprises: an external shield adapted to enclose the irradiation zone; a first internal shield housed by the external shield that encloses the irradiation chamber; and a second internal shield integrally formed with the external shield to partition an interior region of the irradiation zone from an open portion of an open region of a conveyor system defining the means for substantially and continuously moving the articles to be irradiated through the irradiation zone at least a first velocity.

* * * * *